US012431005B2

(12) United States Patent
Fawcett et al.

(10) Patent No.: US 12,431,005 B2
(45) Date of Patent: *Sep. 30, 2025

(54) PROGRAMMABLE SECURITY SYSTEM AND METHOD FOR PROTECTING MERCHANDISE

(71) Applicant: InVue Security Products Inc., Charlotte, NC (US)

(72) Inventors: Christopher J. Fawcett, Charlotte, NC (US); Jeffrey A. Grant, Charlotte, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,226

(22) Filed: Aug. 17, 2023

(65) Prior Publication Data

US 2023/0394952 A1 Dec. 7, 2023

Related U.S. Application Data

(63) Continuation of application No. 17/236,479, filed on Apr. 21, 2021, now Pat. No. 11,763,664, which is a (Continued)

(51) Int. Cl.
*G08B 21/00* (2006.01)
*G07C 9/00* (2020.01)
(Continued)

(52) U.S. Cl.
CPC ....... *G08B 25/008* (2013.01); *G07C 9/00309* (2013.01); *G08B 13/00* (2013.01);
(Continued)

(58) Field of Classification Search
CPC ...... G08B 25/008; G08B 13/00; G08B 13/12; G08B 13/14; G08B 13/1445;
(Continued)

(56) References Cited

U.S. PATENT DOCUMENTS 883,335 A 3/1908 O'Connor
3,444,547 A 5/1969 Surek
(Continued)

FOREIGN PATENT DOCUMENTS

CA 2465692 A1 11/2004
CN 201297072 Y 8/2009
(Continued)

OTHER PUBLICATIONS

Extended European search report for Application No. 15198379.8, dated Apr. 13, 2016, 7 pages, European Patent Office, Munich, Germany.

(Continued)

*Primary Examiner* — Mark S Rushing
(74) *Attorney, Agent, or Firm* — InVue Security Products Inc.

(57) ABSTRACT

A programmable security system and method for protecting an item of merchandise includes a programming station, a programmable key and a security system. The programming station generates a security code and communicates the security code to a memory of the programmable key. The programmable key initially communicates the security code to a memory of the security device and subsequently operates the security device upon a matching of the security code in the memory of the security device with the security code in the memory of the programmable key. The programmable key may also transfer power via electrical contacts or inductive transfer from an internal battery to the security device to operate a lock mechanism. The security code may be communicated by wireless infrared (IR) systems, electrical contacts or inductive transfer.

19 Claims, 23 Drawing Sheets

Related U.S. Application Data continuation of application No. 16/415,447, filed on May 17, 2019, now Pat. No. 11,017,656, which is a continuation of application No. 15/829,275, filed on Dec. 1, 2017, now Pat. No. 10,297,139, which is a continuation of application No. 15/354,557, filed on Nov. 17, 2016, now Pat. No. 9,858,778, which is a continuation of application No. 14/607,542, filed on Jan. 28, 2015, now Pat. No. 9,501,913, which is a continuation of application No. 14/306,761, filed on Jun. 17, 2014, now Pat. No. 9,171,441, which is a continuation of application No. 14/254,210, filed on Apr. 16, 2014, now Pat. No. 8,890,691, which is a continuation of application No. 13/169,968, filed on Jun. 27, 2011, now abandoned.

(51) Int. Cl.

*G08B 13/00* (2006.01)
*G08B 13/12* (2006.01)
*G08B 13/14* (2006.01)
*G08B 13/24* (2006.01)
*G08B 25/00* (2006.01)

(52) U.S. Cl.

CPC ............. *G08B 13/12* (2013.01); *G08B 13/14* (2013.01); *G08B 13/1445* (2013.01); *G08B 13/1463* (2013.01); *G08B 13/2402* (2013.01); *G08B 13/2434* (2013.01); *G08B 13/2465* (2013.01); *G08B 13/2482* (2013.01); *G07C 2009/00539* (2013.01)

(58) Field of Classification Search

CPC ............ G08B 13/1463; G08B 13/2402; G08B 13/2434; G08B 13/2465; G08B 13/2482; G07C 9/00309; G07C 2009/00539; G07C 2009/00634

USPC ....................................................... 340/568.2

See application file for complete search history.

(56) References Cited

U.S. PATENT DOCUMENTS 3,493,955 A 2/1970 Minasy
3,641,498 A 2/1972 Hedin
3,685,037 A 8/1972 Bennett et al.
3,780,909 A 12/1973 Callahan et al.
3,848,229 A 11/1974 Perron et al.
4,031,434 A 6/1977 Perron et al.
4,117,465 A 9/1978 Timblin
4,144,523 A 3/1979 Kaplit
4,250,533 A 2/1981 Nelson
4,286,305 A 8/1981 Pilat et al.
4,354,613 A 10/1982 Desai et al.
4,486,861 A 12/1984 Harmel
4,573,042 A 2/1986 Boyd
4,594,637 A 6/1986 Falk
4,686,513 A 8/1987 Farrar et al.
4,800,369 A 1/1989 Gomi et al.
4,829,296 A 5/1989 Clark et al.
4,851,815 A 7/1989 Enkelmann
4,853,692 A 8/1989 Wolk et al.
4,914,732 A 4/1990 Henderson et al.
4,926,665 A 5/1990 Stapley et al.
4,980,671 A 12/1990 McCurdy
5,005,125 A 4/1991 Farrar et al.
RE33,873 E 4/1992 Romano
5,117,097 A 5/1992 Kimura et al.
5,140,317 A 8/1992 Hyatt et al.
5,151,684 A 9/1992 Johnsen
5,170,431 A 12/1992 Dawson et al.
5,182,543 A 1/1993 Siegel et al.
5,245,317 A 9/1993 Chidley et al.
5,367,289 A 11/1994 Baro et al.
5,479,799 A 1/1996 Kilman et al.
5,508,694 A 4/1996 Treharne et al.
5,543,782 A 8/1996 Rothbaum et al.
5,570,080 A 10/1996 Inoue et al.
5,589,819 A 12/1996 Takeda
5,605,066 A 2/1997 Hurskainen
5,610,587 A 3/1997 Fujiuchi et al.
5,640,144 A 6/1997 Russo et al.
5,650,774 A 7/1997 Drori
5,656,998 A 8/1997 Fujiuchi et al.
5,701,828 A 12/1997 Benore et al.
5,710,540 A 1/1998 Clement et al.
5,745,044 A 4/1998 Hyatt et al.
5,748,083 A 5/1998 Rietkerk
5,758,522 A 6/1998 York
5,764,147 A 6/1998 Sasagawa et al.
5,767,773 A 6/1998 Fujiuchi et al.
5,793,290 A 8/1998 Eagleson et al.
5,808,548 A 9/1998 Sasgawa et al.
5,836,002 A 11/1998 Morstein et al.
5,838,324 A 11/1998 Roulleaux-Robin
5,864,290 A 1/1999 Toyomi et al.
5,905,446 A 5/1999 Benore et al.
5,942,978 A 8/1999 Shafer
5,942,985 A 8/1999 Chin
5,955,591 A 9/1999 Wischerop et al.
5,964,877 A 10/1999 Victor et al.
5,982,283 A 11/1999 Matsudaira et al.
6,005,487 A 12/1999 Hyatt et al.
6,020,819 A 2/2000 Fujiuchi et al.
6,037,879 A 3/2000 Tuttle
6,043,744 A 3/2000 Matsudaira
6,104,285 A 8/2000 Stobbe
6,118,367 A 9/2000 Ishii
6,122,704 A 9/2000 Hass et al.
6,137,414 A 10/2000 Federman
6,144,299 A 11/2000 Cole
6,255,951 B1 7/2001 De La Huerga
6,275,141 B1 8/2001 Walter
6,297,725 B1 10/2001 Tischendorf et al.
6,300,873 B1 10/2001 Kucharczyk et al.
6,304,181 B1 10/2001 Matsudaira
6,308,929 B1 10/2001 Galant
6,331,812 B1 12/2001 Dawalibi
6,346,886 B1 2/2002 De La Huerga
6,362,726 B1 3/2002 Chapman
6,380,855 B1 4/2002 Ott
6,384,711 B1 * 5/2002 Cregger .................. G07C 9/27 70/277
6,420,971 B1 7/2002 Leck et al.
6,433,689 B1 8/2002 Hovind et al.
6,441,719 B1 8/2002 Tsui
6,474,117 B2 11/2002 Okuno
6,496,101 B1 12/2002 Stillwagon
6,512,457 B2 1/2003 Irizarry et al.
6,525,644 B1 2/2003 Stillwagon
6,531,961 B2 3/2003 Matsudaira
6,535,130 B2 3/2003 Nguyen et al.
D475,051 S 5/2003 Sexton
6,564,600 B1 5/2003 Davis
6,604,394 B2 8/2003 Davis
6,615,625 B2 9/2003 Davis
6,677,852 B1 1/2004 Landt
6,718,806 B2 4/2004 Davis
6,744,122 B1 6/2004 Hashimoto
6,819,252 B2 11/2004 Johnston et al.
6,895,792 B2 5/2005 Davis
6,960,991 B2 11/2005 Orcifalvi et al.
6,961,000 B2 11/2005 Chung
7,002,467 B2 2/2006 Deconinck et al.
7,053,774 B2 5/2006 Sedon et al.
7,102,509 B1 9/2006 Anders et al.
7,385,522 B2 6/2008 Belden, Jr. et al.
D579,318 S 10/2008 Davis
7,482,907 B2 1/2009 Denison et al.
7,629,895 B2 12/2009 Belden, Jr. et al.
7,698,916 B2 4/2010 Davis

(56) References Cited

U.S. PATENT DOCUMENTS

| | | | | |
|---|---|---|---|---|
| 7,737,843 | B2 | 6/2010 | Belden, Jr. et al. | |
| 7,737,844 | B2 | 6/2010 | Scott et al. | |
| 7,737,845 | B2 | 6/2010 | Fawcett et al. | |
| 7,737,846 | B2 | 6/2010 | Belden, Jr. et al. | |
| 7,821,395 | B2 | 10/2010 | Denison et al. | |
| 7,969,305 | B2 | 6/2011 | Belden, Jr. et al. | |
| 8,884,762 | B2 | 11/2014 | Fawcett et al. | |
| 8,890,691 | B2 | 11/2014 | Fawcett et al. | |
| 8,896,447 | B2 | 11/2014 | Fawcett et al. | |
| 9,135,800 | B2 | 9/2015 | Fawcett et al. | |
| 9,171,441 | B2 | 10/2015 | Fawcett et al. | |
| 9,269,247 | B2 | 2/2016 | Fawcett et al. | |
| 9,396,631 | B2 | 7/2016 | Fawcett et al. | |
| 9,478,110 | B2 | 10/2016 | Fawcett et al. | |
| 9,501,913 | B2 | 11/2016 | Fawcett et al. | |
| 9,576,452 | B2 | 2/2017 | Fawcett et al. | |
| 9,659,472 | B2 | 5/2017 | Fawcett et al. | |
| 9,858,778 | B2 | 1/2018 | Fawcett et al. | |
| 10,013,867 | B2 | 7/2018 | Fawcett et al. | |
| 10,062,266 | B1 | 8/2018 | Fawcett et al. | |
| 10,269,202 | B2 | 4/2019 | Denison | |
| 10,297,139 | B2 | 5/2019 | Fawcett et al. | |
| 10,403,122 | B2 | 9/2019 | Fawcett et al. | |
| 10,600,313 | B2 | 3/2020 | Fawcett et al. | |
| 2002/0024418 | A1 | 2/2002 | Ayala et al. | |
| 2002/0024420 | A1 | 2/2002 | Ayala et al. | |
| 2002/0024440 | A1 | 2/2002 | Okuno | |
| 2002/0085343 | A1 | 7/2002 | Wu et al. | |
| 2002/0109580 | A1* | 8/2002 | Shreve | G07C 9/00309 340/5.74 |
| 2002/0180582 | A1 | 12/2002 | Nielsen | |
| 2002/0185397 | A1 | 12/2002 | Sedon et al. | |
| 2003/0058083 | A1 | 3/2003 | Birchfield | |
| 2003/0120922 | A1 | 6/2003 | Sun et al. | |
| 2003/0179606 | A1 | 9/2003 | Nakajima et al. | |
| 2003/0206106 | A1 | 11/2003 | Deconinck et al. | |
| 2003/0234719 | A1 | 12/2003 | Denison et al. | |
| 2004/0003150 | A1 | 1/2004 | Deguchi | |
| 2004/0027236 | A1 | 2/2004 | Zhai | |
| 2004/0046027 | A1 | 3/2004 | Leone | |
| 2004/0046664 | A1 | 3/2004 | Labit et al. | |
| 2004/0051626 | A1* | 3/2004 | Pautler | G07C 9/00817 340/5.61 |
| 2004/0160305 | A1 | 8/2004 | Remenih et al. | |
| 2004/0201449 | A1 | 10/2004 | Denison et al. | |
| 2005/0073413 | A1 | 4/2005 | Sedon et al. | |
| 2005/0077995 | A1 | 4/2005 | Paulsen et al. | |
| 2005/0165806 | A1 | 7/2005 | Roatis et al. | |
| 2005/0231365 | A1 | 10/2005 | Tester et al. | |
| 2005/0242962 | A1 | 11/2005 | Lind et al. | |
| 2007/0131005 | A1 | 6/2007 | Clare | |
| 2007/0144224 | A1 | 6/2007 | Scott et al. | |
| 2007/0146134 | A1 | 6/2007 | Belden et al. | |
| 2007/0159328 | A1 | 7/2007 | Belden et al. | |
| 2007/0194918 | A1 | 8/2007 | Rabinowitz et al. | |
| 2007/0296545 | A1 | 12/2007 | Clare | |
| 2008/0224655 | A1 | 9/2008 | Tilley et al. | |
| 2008/0252415 | A1 | 10/2008 | Larson et al. | |
| 2009/0012372 | A1* | 1/2009 | Burnett | A61B 5/076 600/300 |
| 2009/0013736 | A1 | 1/2009 | Voosen | |
| 2009/0096413 | A1 | 4/2009 | Partovi et al. | |
| 2010/0207575 | A1* | 8/2010 | Pijnenburg | H04B 5/79 320/108 |
| 2010/0238031 | A1 | 9/2010 | Belden, Jr. et al. | |
| 2010/0283584 | A1 | 11/2010 | McAllister | |
| 2011/0084799 | A1* | 4/2011 | Ficko | G07C 9/27 340/5.65 |
| 2011/0084840 | A1 | 4/2011 | Mercier et al. | |
| 2011/0254661 | A1 | 10/2011 | Fawcett et al. | |
| 2012/0047972 | A1 | 3/2012 | Grant et al. | |
| 2012/0119910 | A1 | 5/2012 | Belden, Jr. et al. | |
| 2013/0081434 | A1 | 4/2013 | Grant et al. | |
| 2014/0292515 | A1 | 10/2014 | Fawcett et al. | |
| 2015/0137976 | A1 | 5/2015 | Fawcett et al. | |
| 2015/0348381 | A1 | 12/2015 | Fawcett et al. | |
| 2016/0078702 | A1 | 3/2016 | Grant et al. | |
| 2016/0163167 | A1 | 6/2016 | Fawcett et al. | |
| 2017/0069184 | A1 | 3/2017 | Fawcett et al. | |
| 2017/0236401 | A1 | 8/2017 | Fawcett et al. | |
| 2019/0005802 | A1 | 1/2019 | Fawcett et al. | |
| 2019/0272731 | A1 | 9/2019 | Fawcett et al. | |
| 2020/0219379 | A1 | 7/2020 | Fawcett et al. | |

FOREIGN PATENT DOCUMENTS

| | | | |
|---|---|---|---|
| DE | 4405693 | | 8/1995 |
| DE | 202008011189 | U1 | 12/2009 |
| EP | 0745747 | A1 | 12/1996 |
| FR | 2782402 | A1 | 2/2000 |
| GB | 1531951 | | 11/1978 |
| JP | 8279082 | | 10/1996 |
| JP | 1997-259368 | | 10/1997 |
| KR | 2001-0075799 | | 8/2001 |
| KR | 2002-0001294 | | 1/2002 |
| WO | 90/09648 | A1 | 8/1990 |
| WO | 97/031347 | | 8/1997 |
| WO | 99/23332 | A1 | 5/1999 |
| WO | 1999/047774 | | 9/1999 |
| WO | 2002/043021 | A2 | 5/2002 |
| WO | 2004/023417 | A2 | 3/2004 |
| WO | 2004/093017 | A1 | 10/2004 |
| WO | 2005078667 | A1 | 8/2005 |
| WO | 2008034022 | A2 | 3/2008 |
| WO | 2009014943 | A1 | 1/2009 |

OTHER PUBLICATIONS

Petition for Inter Partes Review of U.S. Pat. No. 9,135,800, Apr. 14, 2016, 66 pages (IPR2016-00895).

Petition for Inter Partes Review of U.S. Pat. No. 9,135,800, Apr. 14, 2016, 64 pages (IPR2016-00896).

Petition for Inter Partes Review of U.S. Pat. No. 8,884,762, Apr. 14, 2016, 63 pages (IPR2016-00892).

Petition for Inter Partes Review of U.S. Pat. No. 9,269,247, Apr. 14, 2016, 65 pages (IPR2016-00899).

Petition for Inter Partes Review of U.S. Pat. No. 9,269,247, Apr. 14, 2016, 65 pages (IPR2016-00898).

Petition for Inter Partes Review of U.S. Pat. No. 7,737,846, Jun. 21, 2016, 73 pages (IPR2016-01241).

Olutope Omogbenigun, Australian Patent Examination Report No. 2 for Australian Patent Application No. 2011295868, Jan. 20, 2015, pp. 1-5, IP Australia, Australia.

Binjie Zhao, Chinese First Office Action for Chinese Patent Application No. 201180052268.4, Dec. 2, 2014, 15 pages, Chinese Patent Office, China.

Yolaine Cussac, International Search Report for International Application No. PCT/US2011/050130 filed Sep. 1, 2011, dated Mar. 14, 2013, 7 pages, The International Bureau of WIPO, Geneva, Switzerland.

Yuchuan Liu, The First Office Action for Chinese Patent Application No. 201002417425 issued Aug. 5, 2011, Chinese Patent Office, Beijing, China.

Ligong Li, The Second Office Action for Chinese Patent Application No. 2012102534555 issued Jul. 21, 2014, Chinese Patent Office, Beijing, China.

Indian First Examination Report for Indian Patent Application No. 3187/CHEMP/2008, Jan. 27, 2015, 2 pages, Indian Patent Office, India.

Russian First Office Action for Russian Patent Application No. 2013113313, Sep. 9, 2015, 3 pages, Russian Patent Office, Russia.

Petition for Inter Partes Review of U.S. Pat. No. 7,737,843, Mar. 20, 2014, 64 pages (IPR 2014-00457).

Petition for Inter Partes Review of U.S. Pat. No. 8,896,447, May 22, 2015, 62 pages.

<http:/www.videx.com/AC_PDFs/Product%20Sheets/CK-GM.pdf>; "Grand Master Key"; 2 pages.

(56) References Cited

OTHER PUBLICATIONS

<http:/www.lockingsystems.com/Pfd_Files/nexgen_xt_SFIC.pdf>; "SFIC Locks NEXGEN XT"; 1 page.
Supplementary European Search Report for related European Patent Application No. EP 06 845 868.6 filed Dec. 20, 2006; date of completion of the search May 7, 2010; 7 pages.
Supplementary European Search Report for related European Patent Application No. EP 06 847 982.3 filed Dec. 20, 2006; date of completion of the search May 7, 2010; 3 pages.
Supplementary European Search Report for related European Patent Application No. EP 06 845 865.2 filed Dec. 20, 2006; date of completion of the search May 12, 2010; 4 pages.
Ligong Li, The First Office Action for Chinese Patent Application No. 2012102534555 issued Dec. 16, 2013, Chinese Patent Office, Beijing, China.
Ziwen Li, The Sixth Office Action for Chinese Patent Application No. 2006800481876, Feb. 17, 2014, 7 pages, Chinese Patent Office.
Videx, CyberKey Tones and Descriptions, Feb. 5, 2008, 2 pages, Videx, Corvallis, Oregon (available at http://www.kenstan.com/pdf/cyberlock_key_tones.pdf).
Videx, Inc., "CyberLock A Complete Access Control System in Every Lock Core", 2010, pp. 1-16, Videx, Inc., Corvallis, Oregon.
David G. Allen, The Kenstan Cyberlock, Jan.-Feb. 2009, 1 page, Kenstan Lock Company, Plainview, New York.
Kenstan, Kassoy the World Leader In Jewelry Supply, 2010 Catalog, 2 pages, Kenstan Lock Company (available at http://www.kenstan.com).
European Patent Office, Rule 161 A EPC communication for European Patent Application No. EP 11754598.8, Apr. 9, 2013, pp. 1-7, Rijswijk, Netherlands.
"Notification of Transmittal of International Search Report and Written Opinion of the International Searching Authority, or the Declaration" in International Patent Application No. PCT/US2011/050130, filed Sep. 1, 2011, dated Nov. 23, 2011, 12 pages, European Patent Office, Rijswijk, Netherlands.
Wayback Machine, SAAA Specialists in the Protection Against Shoplifting, Nov. 24, 2006, 3 pages, Gallardon, France (available at the Wayback Machine website).
Olutope Omogbenigun, Australian Patent Examination Report No. 1 for Australian Patent Application No. 2011295868, Nov. 15, 2013, pp. 1-5, IP Australia, Australia.
Petition for Inter Partes Review of U.S. Pat. No. 7,737,844, Sep. 30, 2016, 76 pages (IPR2016-01915).
Russian Second Office Action for Russian Patent Application No. 2013113313, Apr. 27, 2016, 7 pages, Russian Patent Office, Russia.
Russian Third Office Action for Russian Patent Application No. 2013113313, Sep. 19, 2016, 4 pages, Russian Patent Office, Russia.
Petition for Inter Partes Review of U.S. Pat. No. 9,396,631, Nov. 29, 2016, 65 pages (IPR2017-00344).
Petition for Inter Partes Review of U.S. Pat. No. 9,396,631, Nov. 29, 2016, 63 pages (IPR2017-00345).
Schneier, Bruce, Applied Cryptography: Protocols, Algorithms, and Source Code in C, 1994, John Wiley & Sons, Inc., New York, NY, Table of Contents and Excerpts, 14 pages.
Petition for Inter Partes Review of U.S. Pat. No. 9,478,110, Jul. 31, 2017, 68 pages (IPR2017-01900).
Clements, Alan. Computer Organization and Architecture: Themes and Variations, 2014. Cengage Learning, Stamford, CT, Excerpts, 4 pages.
Petition for Inter Partes Review of U.S. Pat. No. 9,478,110, Jul. 31, 2017, 71 pages (IPR2017-01901).
Examination report from related European Application No. 15198379.8 dated Jan. 23, 2017 (7 pages).
Petition for Post-Grant Review of Claims 1-45 of U.S. Pat. No. 9,659,472, dated Oct. 17, 2017, 93 pages (PGR2018-00004).
Final Written Decision for Inter Partes Review of U.S. Pat. No. 8,884,762, dated Sep. 28, 2017, 71 pages (IPR2016-00892).
Final Written Decision for Inter Partes Review of U.S. Pat. No. 9,269,247, dated Sep. 28, 2017, 78 pages (IPR2016-00898 and IPR2016-00899).
Final Written Decision for Inter Partes Review of U.S. Pat. No. 9,135,800, dated Oct. 12, 2017, 82 pages (IPR2016-00895 and IPR2016-00896).
Daher, John K., et al., "Test Concept and Experimental Validation of the Use of Built-In-Test to Simplify Conducted Susceptibility Testing of Advanced Technology Integrated Circuits and Printed Circuit Boards", 1990, Georgia Tech Research Institute, Georgia Institute of Technology, Atlanta, Georgia (5 pages).
New Webster's Dictionary and Thesaurus of the English Language, 1992, Lexicon Publications, Inc., Santa Barbara, California, Excerpt, p. 747.
McGraw-Hill Dictionary of Scientific and Technical Terms, Sixth Edition, 2003, The McGraw-Hill Companies, Inc., New York, New York, Excerpts, pp. 689-690, 1672.
McGraw-Hill Dictionary of Scientific and Technical Terms, Sixth Edition, 2003, The McGraw-Hill Companies, Inc., New York, New York, Excerpts, pp. 689-690, 1231.
Final Written Decision for Inter Partes Review of U.S. Pat. No. 9,396,631, May 24, 2018, 94 pages (IPR2017-00344 and IPR2017-00345).
Petition for Inter Partes Review of U.S. Pat. No. 9,659,472, May 22, 2018, 71 pages (IPR2018-01138).
Final Written Decision from Inter Partes Review of U.S. Pat. No. 7,737,846, dated Dec. 19, 2017, 34 pages (IPR2016-01241).
Final Written Decision from Inter Partes Review of U.S. Pat. No. 7,737,844, dated Mar. 28, 2018, 51 pages (IPR2016-01915).
Petition for Inter Partes Review of U.S. Pat. No. 9,576,452, Jan. 12, 2018, 73 pages (IPR2018-00481).
Final Written Decision from Inter Partes Review of U.S. Pat. No. 9,478,110, dated Feb. 12, 2019, 71 pages (IPR2017-01900 and IPR2017-01901).
Final Written Decision from Inter Partes Review of U.S. Pat. No. 9,576,452, dated Jul. 16, 2019, 55 pages (IPR2018-00481).
Final Written Decision from Inter Partes Review of U.S. Pat. No. 9,659,472, dated Dec. 5, 2019, 55 pages (IPR2018-01138).
Petition for Inter Partes Review of U.S. Pat. No. 10,062,266, dated Aug. 28, 2019, 75 pages (IPR2019-01553).
Decision Denying Institution of Inter Partes Review of U.S. Pat. No. 10,062,2666, dated Mar. 6, 2020, 30 pages (IPR2019-01553).

* cited by examiner

FIG-5
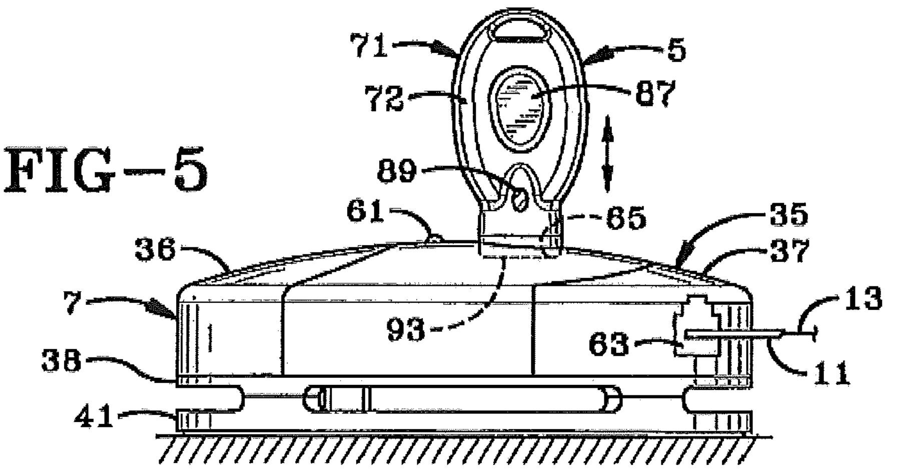
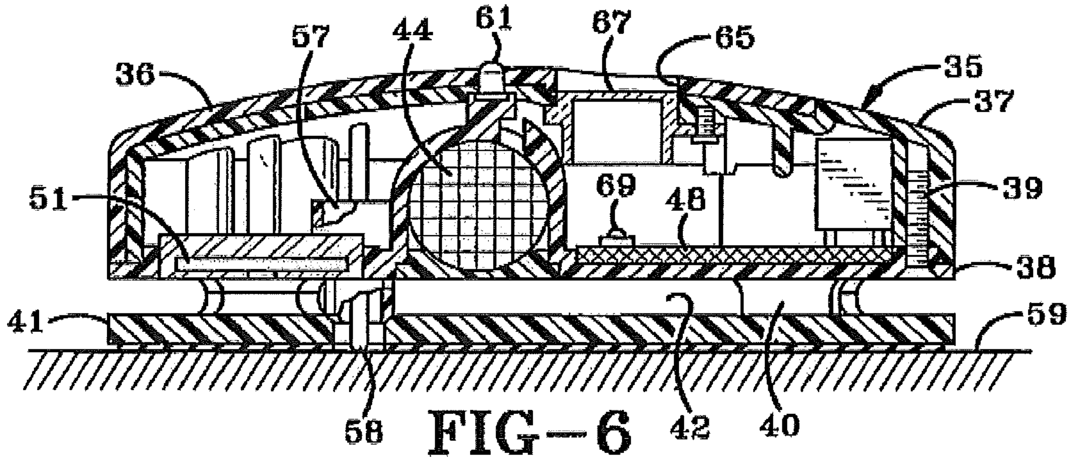
FIG-6
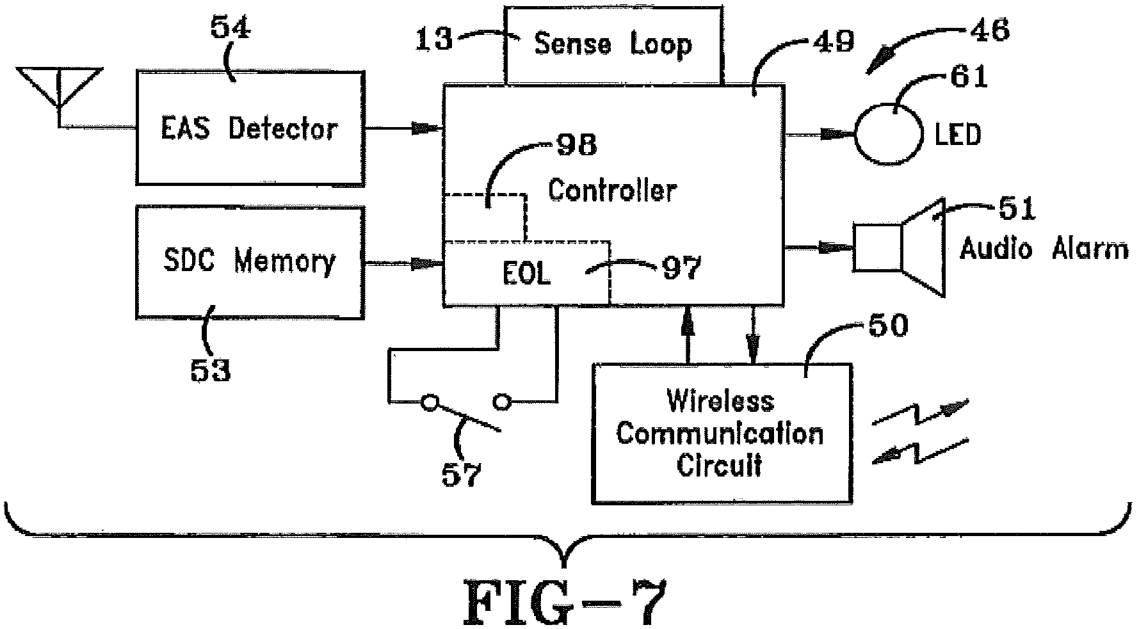
FIG-7

PROGRAMMABLE SECURITY SYSTEM AND METHOD FOR PROTECTING MERCHANDISE

CROSS REFERENCE TO RELATED APPLICATIONS

This application is a continuation of U.S. application Ser. No. 17/236,479, filed on Apr. 21, 2021, which is a continuation of U.S. application Ser. No. 16/415,447, filed on May 17, 2019, which is a continuation of U.S. application Ser. No. 15/829,275, filed on Dec. 1, 2017, and now U.S. Pat. No. 10,297,139, which is a continuation of U.S. application Ser. No. 15/354,557, filed on Nov. 17, 2016, and now U.S. Pat. No. 9,858,778, which is a continuation of U.S. application Ser. No. 14/607,542, filed on Jan. 28, 2015 and now U.S. Pat. No. 9,501,913, which is a continuation of U.S. application Ser. No. 14/306,761, filed on Jun. 17, 2014, and now U.S. Pat. No. 9,171,441, which is a continuation of U.S. application Ser. No. 14/254,210, filed on Apr. 16, 2014, and now U.S. Pat. No. 8,890,691, which is a continuation of U.S. application Ser. No. 13/169,968, filed on Jun. 27, 2011, and now abandoned, the entire disclosures of which are incorporated herein by reference.

FIELD OF THE INVENTION

The invention relates to security systems and methods for protecting merchandise from theft, and in particular, to a security system and method including a programmable key that is programmed with a security code from a programming station and is subsequently used to program and/or operate an alarm module attached to an item of merchandise.

BACKGROUND OF THE INVENTION

Retail stores use numerous types of theft deterrent security devices and security systems to discourage shoplifters. Many of these security systems use an alarm module or other security device that is attached to an item of merchandise to be protected. When the integrity of the security system or the item of merchandise protected thereby is compromised in any manner, such as by cutting a cable that attaches the item of merchandise to the alarm module, by removing the merchandise from the alarm module, by removing the alarm module from a fixture or support, or by interrupting a sense loop monitoring one or more sensors, the alarm module causes an audible alarm to be sounded to alert store personnel of a potential theft. The alarm module, as well as the item of merchandise protected thereby, may also contain various electronic article surveillance (EAS) devices that sound an alarm upon passing through a security gate.

These alarm modules or other security devices that are attached to the item of merchandise usually have some type of key, either mechanical, electrical or magnetic, which is used to arm and disarm the alarm associated with the alarm module, and in certain instances, to unlock or remove the item of merchandise from the alarm module to allow the merchandise to be taken to a cashier for purchase or to be taken from the checkout counter after purchase. A known problem with such security systems is that the keys may be stolen from the retail store and used at the same store or at another store using the same type of alarm module or other security device, to enable a shoplifter to disarm the alarm module or to unlock the security device from the merchandise. Keys may also be stolen by a dishonest employee and used by the employee in an unauthorized manner or passed to a shoplifter for use at the same store or at another store having the same type of alarm module or security device controlled by the key. It is extremely difficult to prevent the theft of security system keys by shoplifters or dishonest employees within a retail store due to the large number of keys that must be made available to store personnel in various departments of the store to facilitate use of the numerous alarm modules and other security devices needed to protect the valuable items of merchandise on display in the retail store.

Thus, the need exists for an improved security system and method including an alarm module or other security device for protecting an item of merchandise attached to the alarm module or other security device for display in a retail store. There exists a further and more particular need for a security system and method including a programmable key that is configured to prevent a shoplifter or dishonest store employee from using a key stolen from a retail store to disarm or unlock an alarm module or other security device at the same store or at another store that utilizes the same type of alarm module or other security device.

BRIEF SUMMARY OF THE INVENTION

In one aspect, the present invention provides a security system and method for protecting an item of merchandise including a programmable key for arming and disarming an alarm module or other security device attached to the item of merchandise. The key is programmable with a unique security code, referred to herein as a Security Disarm Code (SDC), which code is provided to the key by a programming station. The SDC is unique to a particular retail store, thereby preventing a key from being used at a different retail store than the one from which the key is stolen.

Another aspect of the present invention is to use the SDC programmed into the key by the programming station to program each alarm module or other security device used in that retail store with the same SDC when the alarm module or other security device is first activated. In a preferred embodiment, the SDC then remains with the alarm module throughout its use in that retail store.

Another aspect of the present invention is to provide such a security system and method including a programmable key provided with an internal timer that after a predetermined (i.e. factory set) or preset (i.e. at the retail store) period of time, for example 96 hours, automatically invalidates or inactivates the SDC in the key, thereby preventing its unauthorized use even in the retail store in which the programming station is located and the SDC was initially programmed into the key.

A feature of the present invention is to require the programmable key to be reprogrammed with the SDC by the programming station within a predetermined or preset period of time. In a preferred embodiment, the act of reprogramming the key may be performed only by authorized store personnel, thereby ensuring that the key will only be used by authorized persons and only in the retail store having the programming station and unique SDC for the alarm modules or other security devices in that store.

Another aspect of the present invention is to provide the programmable key with an internal counter that counts the number of activations of an alarm module or other security device performed by the key, for example the initial activation (i.e. arming) of alarm modules or other security devices as well as each time the key is used to disarm or re-arm the alarm module or other security device. In a preferred embodiment, upon a predetermined maximum number of activations occurring the key will become permanently inactivated, thereby ensuring that a useable key always has a sufficient amount of internal power to receive the SDC from the programming station and to subsequently communicate (i.e. transmit and receive data) with the alarm module or other security device to arm and disarm the alarm module or other security device, as required. Furthermore, the internal counter may cause a logic control circuit to activate an indicating signal a predetermined time before the logic control circuit of the key is permanently deactivated upon the predetermined maximum number of activations occurring.

Another aspect of the present invention is to provide various forms of data communication between the various elements of the security system, namely the programming station, programmable key, and the alarm modules or other security devices activated and deactivated by the key. In one preferred embodiment, data (e.g. the SDC) is communicated between the various components of the security system by wireless communication, such as infrared (IR), radio frequency (RF) or similar wireless communication system. In another preferred embodiment, data is communicated between the various components of the security system through electrical contacts. In yet another preferred embodiment, data is communicated between the various components of the security system by induction, for example electromagnetic induction, magnetic induction, electrostatic induction, etc.

Another aspect of the present invention is to provide such a security system and method including a programmable key and an alarm module or other security device configured to actuate an alarm if a key programmed with a different SDC than the alarm module or other security device is used to attempt to disarm the alarm module or other security device.

Another feature of the present invention is that the security system may be configured to retain the SDC in the programming station within a non-volatile memory, thereby enabling the SDC to survive a power interruption.

Another feature of the present invention is that the security system may be configured to enable the programming station to immediately "time-out" the key, thereby preventing subsequent use of the key, upon the programming station reading a SDC stored in the key that does not match the SDC of the programming station.

Another feature of the present invention is that the programming station may be provided with a plurality of visual indicators that are illuminated and/or pulsed to indicate the operational status of the programming station.

Another feature of the present invention is that the a logic control circuit of the alarm module or other security device may include an operational lifetime timer that is preset for a predetermined lifetime to ensure that an internal battery maintains sufficient power for operating the alarm module or other security device, and further, that the alarm module or other security device includes a timer that records the amount of time an alarm is activated by the alarm module or other security device and the logic control circuit automatically reduces the lifetime of the operational lifetime timer. In a preferred embodiment, the logic control circuit automatically disables the alarm module or other security device at the end of the lifetime of the operational lifetime timer.

Another feature the present invention is that the operational lifetime timer of the alarm module or other security device may be configured to activate a near end-of-life signal a predetermined time before the logic control circuit completely disables the alarm module or other security device, thereby enabling store personnel to substitute an alarm module or other security device having a sufficiently charged internal battery.

Another feature of the present invention is that the alarm module or other security device may be provided with a plurality of connection ports for attaching one or more attachment cables extending between the alarm module or other security device and items of merchandise. Each such attachment cable may contain a sense loop that will activate an alarm in the event that the integrity of the sense loop is compromised.

Another feature of the present invention is that the logic control circuit of the programming station may be configured to permanently inactivate the SDC in a programmable key if the SDC programmed in the key does not match the SDC of the programming station when a logic control circuit of the programmable key is in communication with a logic control circuit of the programming station.

Another feature of the present invention is that the programming station may be provided with a plurality of light-emitting diodes (LEDs) that indicate various status displays depending upon the condition and state of operation of the programming station.

Another feature of the present invention is that the programming station may be provided with mechanical attachment means for securing it to a supporting structure in a secure location in which the programming station is connected to an external power source, thereby ensuring that power is available to the programming station and avoiding the use of an internal battery.

Another aspect of the present invention is to provide such a security system and method including a programming station for programming a programmable key and an alarm module or other security device each having a light pipe to facilitate the transfer of infrared (IR) wireless communication between the key and the alarm module or other security device. In a preferred embodiment, at least a portion of a housing of the programming station is formed of a material suitable to facilitate the transmission of infrared (IR) waves between the wireless communication systems of the programming station and the key.

Another feature of the present invention is that sense loops extending between the alarm module or other security device and the item of merchandise may be formed of an electrical conductor or fiber optic conductor located within an outer mechanical attachment cable.

The above aspects and features are provided by a security system for protecting an item of merchandise according to the present invention, the general nature of which may be stated as including a programmable key, a programming station for generating a security code in the key and a security device, such as an alarm module, for attachment to an item of merchandise wherein the security device receives the security code from the key to initially activate the security device and to subsequently disarm and re-arm the security device.

The above aspects and features are further provided by a method for protecting an item of merchandise according to the present invention, the general nature of which may be stated as including the steps of attaching a security device, such as an alarm module, to the item of merchandise, programming a programmable key with a security code, programming the security code from the key into the security device, disarming the security device upon verifying that the security code in the alarm module with the security code in the key, and invalidating the security code in the key after a predetermined or preset period of time to prevent subsequent disarming of the security device unless the security code is refreshed in the key within the predetermined or preset period of time.

BRIEF DESCRIPTION OF THE DRAWINGS

One or more exemplary and preferred embodiments of the invention illustrating the best mode presently contemplated for applying its principles is set forth in the following detailed description, is shown in the accompanying drawings and is particularly and distinctly pointed out and set forth in the appended claims.

FIG. 5 is a side elevation view of a security device for use with the security system of FIG. 1.

FIG. 6 is a cross-sectional elevation view of the security device shown in FIG. 5.

FIG. 7 is a block diagram depicting the logic control circuit of the security device shown in FIG. 5.

Similar reference numbers and characters refer to like or similar parts throughout the various drawings.

DETAILED DESCRIPTION OF EMBODIMENTS OF THE INVENTION

Figure 1:
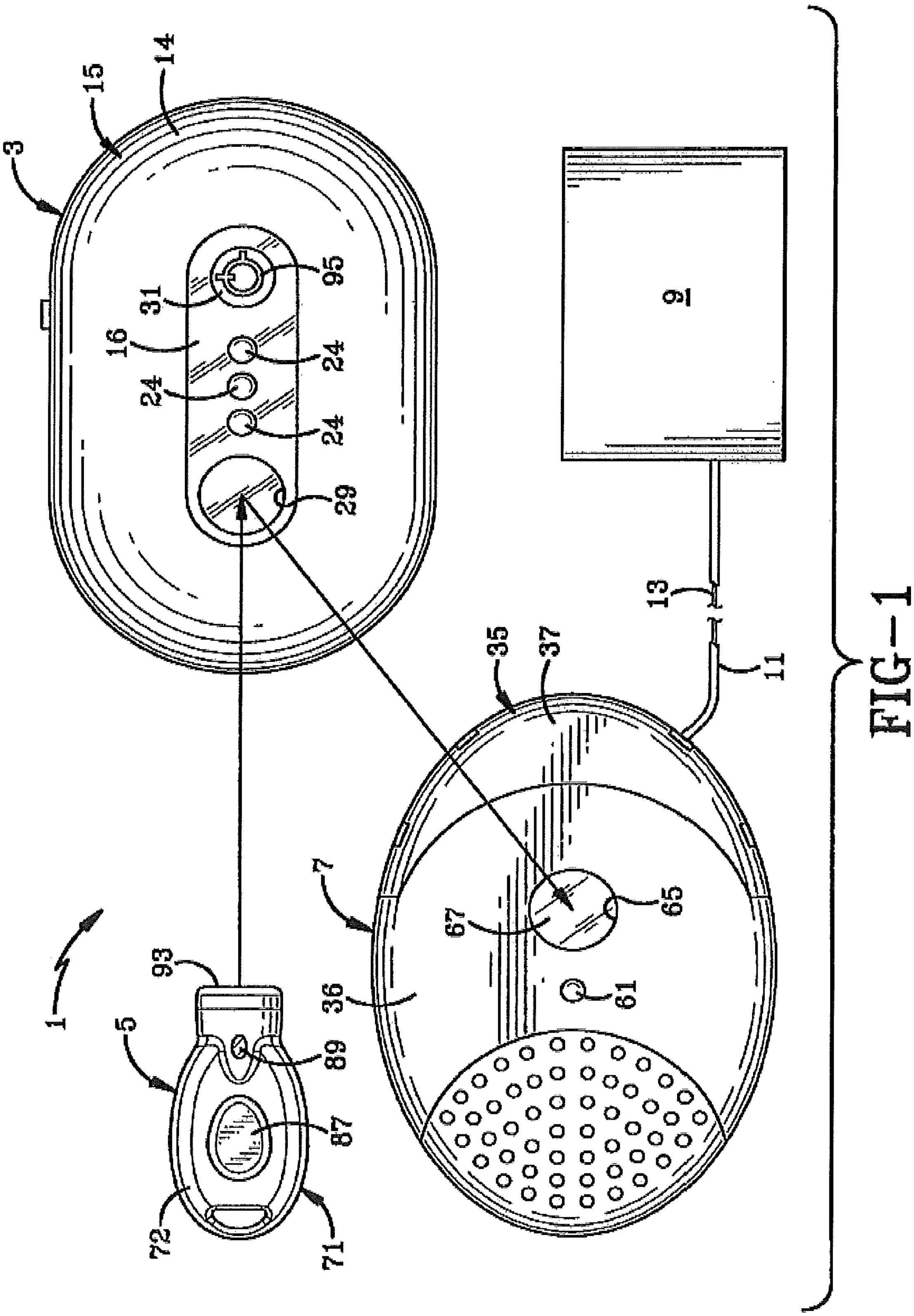
FIG. 1 is a diagrammatic view showing the components of a security system according to the present invention.

An exemplary and preferred embodiment of a security system according to the present invention is shown in FIG. 1 and indicated generally at 1. Security system 1 includes three primary components, a programming station 3, a programmable key 5 and an alarm module 7 adapted to be attached to an item of merchandise 9 by an attachment device, such as a cable 11 that preferably contains a sense loop 13.

Figure 3:
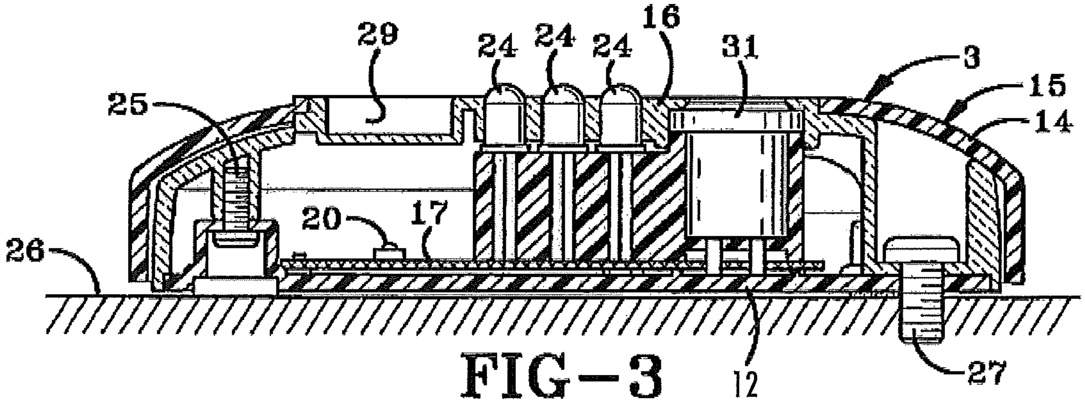
FIG. 3 is a cross-sectional elevation view of the programming station shown in FIG. 2.
Figure 4:
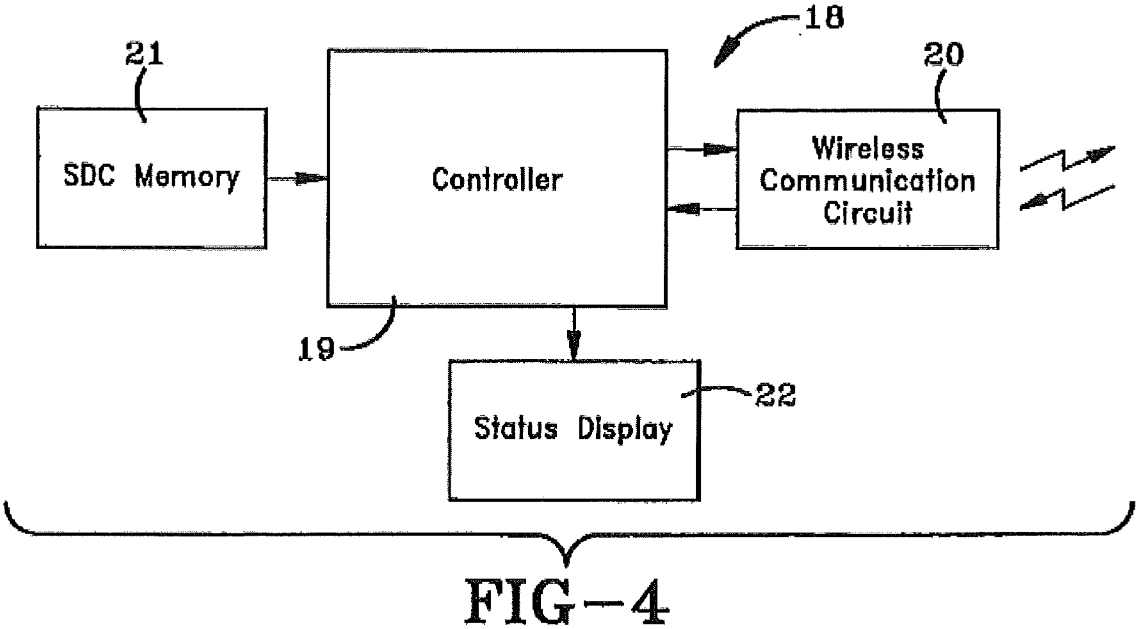
FIG. 4 is a block diagram depicting the logic control circuit of the programming station shown in FIG. 2.

Programming station 3 preferably is of the type shown and described in greater detail in related U.S. Pat. No. 7,737,844, filed on Dec. 14, 2006, and entitled PROGRAMMING STATION FOR A SECURITY SYSTEM FOR PROTECTING MERCHANDISE, the entire disclosure of which is incorporated herein by reference. Programming station 3 is further shown in FIGS. 2-4 and includes a housing 15 formed by an internal housing shell 16 preferably having at least a portion thereof formed of an infrared clear plastic material to facilitate the transfer of infrared wireless communication waves, as discussed further below. Housing 15 comprises a top cover plate 14 that is preferably snap-fit onto housing shell 16 and a printed circuit board 17 containing a logic control circuit 18 disposed thereon. Logic control circuit 18 is shown in block diagram form in FIG. 4.

Figure 2:
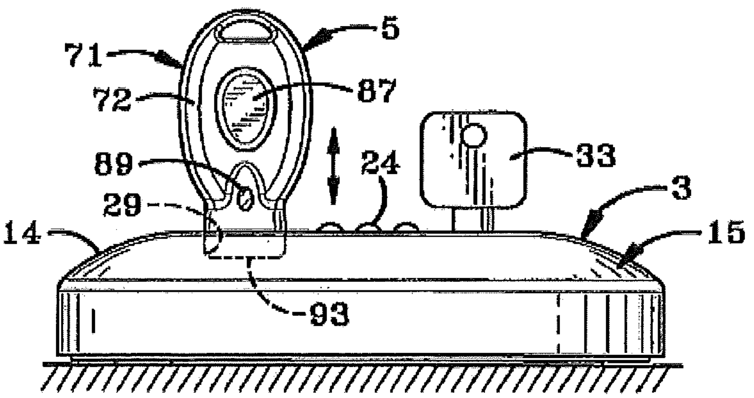
FIG. 2 is a side elevation view of the programming station and the programmable key of the security system of FIG. 1.

Logic control circuit 18 includes a main controller 19, which preferably is a microprocessor, a communication circuit 20 and a security code memory 21 communicating with controller 19. The security code memory 21 stores a security code, also referred to herein as a Security Disarm Code or SDC. A status display 22 consisting of three LEDs 24 (FIG. 3), as shown herein, is also a part of logic control circuit 18 and provides a visual indication of the status of logic control circuit 18 of programming station 3 during and after use of the programming station for programming the SDC into a programmable key 5. Housing shell 16 is secured to a base 12 by fasteners 25. In turn, base 12 may be secured to a supporting structure, or support 26, such as a countertop or shelf, by fasteners 27. Alternatively, base 12 may be secured to the support 26 by a double-sided pressure sensitive adhesive (PSA). Communication circuit 20, and in particular the transmission and receive components thereof, are aligned with a key receiving port 29 formed in housing shell 16, which port is adapted to receive the programmable key 5 therein, as shown in FIG. 2. In a preferred embodiment, communication circuit 20 and the various components thereof formed on circuit board 17, define a wireless communication system. As shown and described with respect to the security system of FIG. 1, the wireless communication system is an infrared (IR) system, although radio frequency (RF) or other types of wireless communications could also be utilized. As will be described hereafter, other types of communication systems, including for example, electrical conduction and magnetic induction may also be utilized.

A key-actuated tumbler switch 31 is mounted in housing 15 and is controlled by a mechanical activation key 33 for activating the logic control circuit 18 within programming station 3 for programming a programmable key 5 with the SDC as discussed further below. The particular circuitry of logic control circuit 18 is shown in further detail in the U.S. Pat. No. 7,737,844 referenced above, but could be other types of circuitry than that shown therein that are readily known to those skilled in the art for obtaining the features and results of the programming station 3, as discussed further below.

Programming station 3 preferably is powered by an external power supply such as a usual 120 volt electrical outlet readily found in a typical retail store. Preferably, programming station 3 will be secured to support 26 in a secure location, such as inside the store manager's office or similar location with restricted access. Likewise, activation key 33 will be kept in the possession of the store manager or other authorized person to prevent the unauthorized use of programming station 3.

Alarm module 7, shown particularly in FIGS. 5-7 is one type of security device suitable for use with a security system according to the present invention. Alarm module 7 is of the type shown and described in greater detail in related U.S. Pat. No. 7,737,843 filed on Dec. 14, 2006, and entitled Programmable Alarm Module And System For Protecting Merchandise, the entire disclosure of which is incorporated herein by reference. Alarm module 7 includes a housing 35 preferably formed of a plastic material comprising a top cover plate 36 that is snap-fit onto a top housing member 37, which in turn is secured to a bottom housing member 38 by a plurality of fasteners 39. Posts 40 extending between a base 41 and bottom housing member 38 provide an open sound space 42 therebetween, as best shown in FIG. 6.

An internal battery 44 is mounted in the interior of housing 35 and provides a source of power to a logic control circuit, shown diagrammatically in FIG. 7 and indicated generally at 46, that is formed on a printed circuit board 48 (FIG. 6) mounted within housing 35. Logic control circuit 46 includes a main controller 49 and a communication circuit 50. In a preferred embodiment, communication circuit 50 defines a wireless communication circuit, and more preferably, is an infrared (IR) system so as to be compatible with the infrared (IR) system of programming station 3 discussed above. Logic control circuit 46 furthermore includes an audible alarm 51, such as a piezoelectric alarm, mounted within housing 35 that communicates directly with sound space 42, as shown in FIG. 6. Logic control circuit 46 further includes a security code (i.e. SDC) memory 53, an EAS detector circuit 54, and one or more sense loops 13. A plunger switch 57 preferably is mounted within bottom housing member 38 and includes a plunger 58 that engages supporting structure, or support 59 on which alarm module 7 is mounted. As previously mentioned with respect to programming station 3, alarm module 7 may be secured to support 59 with one or more attachment screws (not shown), or alternatively, by a double-sided pressure sensitive adhesive (PSA). Plunger switch 57 will activate alarm 51 if the alarm module 7 is removed from support 59 in an unauthorized manner. An LED 61 is connected to logic control circuit 46 and extends through openings formed in top housing member 37 and cover plate 36 to provide a visual indication of the status the logic control circuit 46 of alarm module 7.

One or more connection jacks 63 (FIG. 5) are formed in alarm module 7 for connecting an attachment cable 11 to alarm module 7. Cable 11 preferably contains at least one sense loop 13 comprising electrical conductors, fiber optic conductors or the like. As shown in FIG. 1, cable 11 extends between alarm module 7 and an item of merchandise 9 to be protected by the security system 1. Each sense loop 13 is operably connected to controller 49 of logic control circuit 46 so that should the integrity of the cable 11 or sense loop 13 be compromised, such as by cutting of the cable 11, or by pulling the cable 11 loose from alarm module 7 or from merchandise 9, or by removing the cable 11 from the connection jack 63 on alarm module 7, controller 49 will activate audible alarm 51 and/or cause LED 61 to emit a predetermined flashing pattern. If desired, cable 11 could be connected to a tensioned recoiler located within alarm module 7 without affecting the broad concept and intended scope of the invention. Alternatively, cable 11 could be a helical coil cable that is inherently extensible and retractable. Regardless, the primary objective is that the one or more conductors of the sense loop 13 are electrically, optically or otherwise connected between controller 49 and the item of merchandise 9.

A key receiving port 65 is formed through top cover plate 36 and top housing member 37 of housing 35 adjacent a light pipe 67 to enhance the transmission of wireless communication signals, such as infrared (IR) signals, when a programmable key 5 is placed in key receiving port 65 and aligned with the transmitter and receiver, or transceiver 69 mounted on printed circuit board 48 below the port 65, as shown in FIG. 6. Light pipe 67 facilitates the transmission of infrared (IR) waves between programmable key 5, as discussed further hereinafter, and transceiver 69 of communication circuit 50. Further details regarding the manner of operation of alarm module 7 are shown and described in the U.S. Pat. No. 7,737,843 referenced above. It will be readily understood by those skilled in the art that other types of communication circuits than shown therein and shown herein in FIG. 7 could be utilized to achieve the objectives and features of alarm module 7 without affecting the broad concept and intended scope of the invention.

Figure 8:
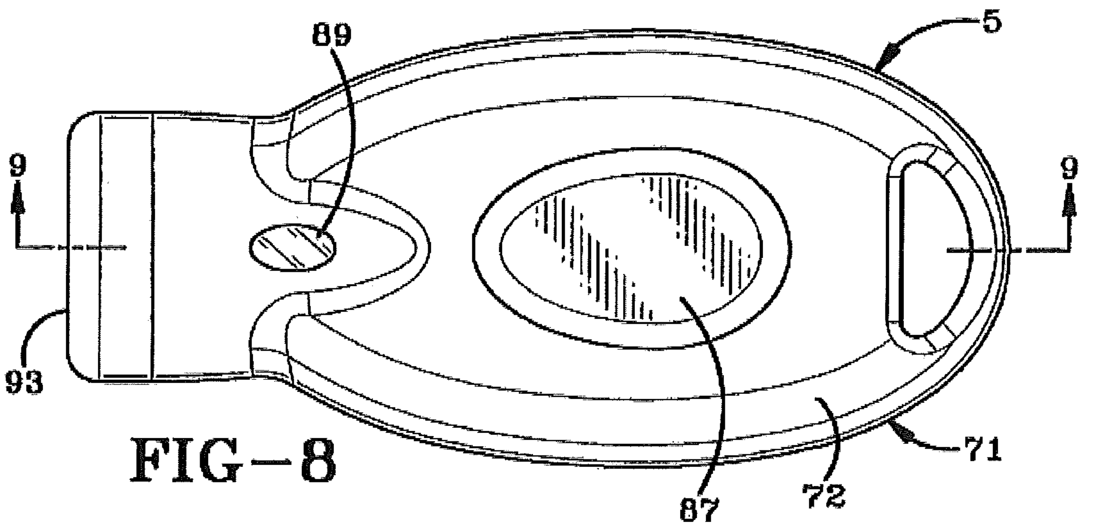
FIG. 8 is a top plan view of the programmable key of the security system shown in FIG. 1.
Figure 9:
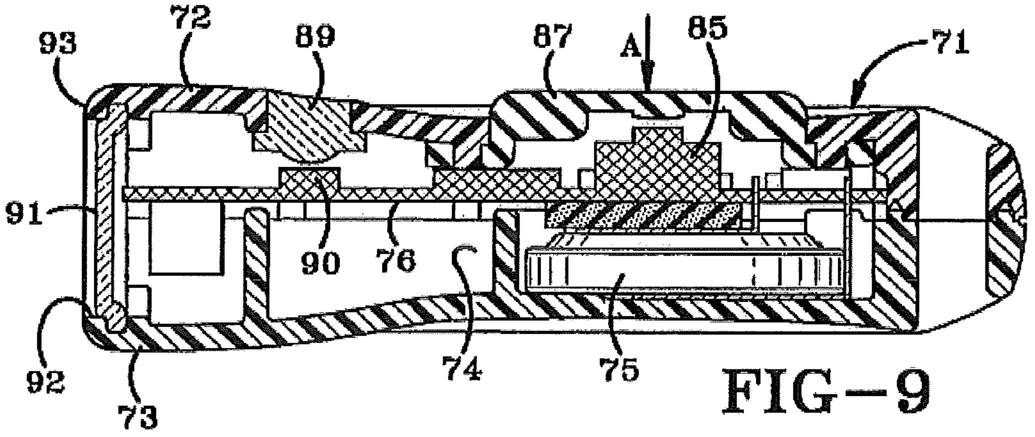
FIG. 9 is a cross-sectional elevation view of the programmable key shown in FIG. 8 taken along line 9-9.
Figure 10:
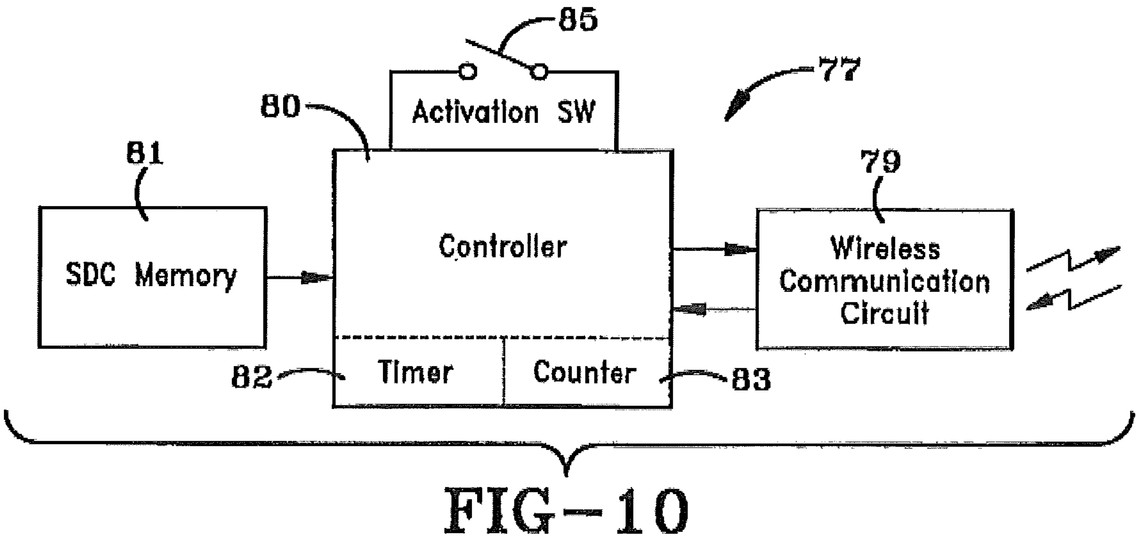
FIG. 10 is a block diagram depicting the logic control circuit of the programmable key shown in FIG. 8.

A programmable key 5 for use with security system 1 is shown in detail in FIGS. 8-10. Key 5 includes a housing 71 formed by upper and lower housing members 72 and 73, respectively, that are joined together to form a hollow interior 74 in which is mounted an internal battery 75 and a printed circuit board 76 containing a logic control circuit shown in block diagram form in FIG. 10 and indicated generally at 77. As shown in FIG. 10, logic control circuit 77 will include a communication circuit 79. In a preferred embodiment, communication circuit 79 is a wireless communication circuit, and more preferably, is an infrared (IR) system so as to be compatible with the infrared (IR) wireless communication circuits of the programming station 3 and the alarm module 7 previously described. A central controller 80, for example a microprocessor, controls the communication circuit 79, a security code (i.e. SDC) memory 81, an internal timer 82 and an activation counter 83. Logic control circuit 77 is energized by an activation switch 85 which is mounted on circuit board 76 and located beneath a flexible member 87 mounted in upper housing member 72. When flexible member 87 is depressed in the direction indicated by Arrow A in FIG. 9, activation switch 85 actuates the controller 80 of logic control circuit 77.

A light pipe 89 preferably is mounted in upper housing member 72 in alignment with an LED 90 mounted on printed circuit board 76. LED 90 provides a visual indication to a user of the status and activation of programmable key 5, as discussed further hereinafter. An optically transparent lens 91 is mounted in an opening 92 of a transfer end 93 of housing 71. Lens 91 preferably is a visible light filter to enhance the transmission and reception of infrared (IR) waves when the key 5 interacts with programming station 3 and alarm module 7, as will be described hereinafter. The circuitry and components of a logic control circuit 77 of one type of programmable key 5 suitable for use with a security system 1 according to the present invention are shown and described in greater detail in related U.S. Pat. No. 7,737,845 filed on Dec. 14, 2006, and entitled PROGRAMMABLE KEY FOR A SECURITY SYSTEM FOR PROTECTING MERCHANDISE, the entire disclosure of which is incorporated herein by reference. However, it will be readily understood by those skilled in the art that other circuitry and components can be utilized to achieve the objectives and features of programmable key 5 than shown and discussed therein without affecting the broad concept and intended scope of the invention.

FIG. 1 best illustrates an exemplary and preferred system and method of the present invention. Programming station 3 is actuated by mechanical activation key 33 being placed in key opening 95 and turned to the "on" position to energize the programming station. Programmable key 5 is placed in key receiving port 29 and activation switch 85 is actuated by depressing flexible member 87. Actuation of activation switch 85 causes logic control circuit 18 of programming station 3 to randomly generate a unique security code (i.e. SDC) that is transmitted via communication circuit 20 to communication circuit 79 of programmable key 5, which in turn stores the randomly generated SDC in security code (SDC) memory 81 of the key. One or more of the LEDs 24 of programming station 3 and LED 90 of programmable key 5 (visible through light pipe 89) illuminate or flash to indicate that programming station 3 is activated and operating satisfactorily, and that the SDC has been transmitted to programmable key 5 and successfully stored in SDC memory 81.

In accordance with one of the objectives and features of the present invention, the SDC initially provided by programming station 3 is randomly generated and is unique to that programming station and always remains with that programming station for subsequent use. Thus, the SDC initially generated always stays with the programming station 3 and is subsequently programmed into one or more programmable keys 5. Once programmed with the SDC, key 5 is taken to one or more alarm modules 7 (or other security devices) and key end 93 is inserted into key receiving port 65, as shown in FIG. 5. Activation switch 85 of key 5 is then actuated, thereby programming the SDC via the communication circuit 50 of alarm module 7 and communication circuit 79 of key 5 into security code (SDC) memory 53 of the logic control circuit 46 of the alarm module 7. SDC memory 53 permanently stores the randomly generated SDC in the alarm module 7, preferably for the remaining lifetime of the alarm module. Upon actuation of activation switch 85, LED 90 of programmable key 5 and LED 61 of alarm module 7 flash in a predetermined pattern to indicate that a successful programming of the alarm module with the SDC has occurred.

In accordance with another of the objective and features of the present invention, when the SDC is stored in SDC memory 81, controller 80 of key 5 actuates a timer 82 for a predetermined time period, for example 96 hours. At the end of this time period, controller 80 automatically invalidates use of the SDC in SDC memory 81 by logic control circuit 77 to thereby render the key inoperative for use with alarm module 7. For example, controller 80 of logic control circuit 77 may prevent communication circuit 79 from transmitting the SDC from SDC memory 81. Alternatively, the SDC may be erased from SDC memory 81 so that it is no longer available for use with alarm module 7. Regardless, in this manner a programmable key 5 stolen by a thief or dishonest employee cannot be used to after passage of the predetermined time period to disarm an alarm module 7 in the same store from which the key was stolen. Furthermore, since the SDC in the programmable key 5 is unique to the particular programming station 3 of the retail store that was used to program the key with the SDC, that key cannot be taken to another retail store having the same type of alarm module 7 and used during the predetermined time period to disarm that alarm module. The programmable key 5 will not function with the alarm module 7 in the other retail store since that alarm module will have been programmed with a different SDC randomly generated by a different programming station 3. Thus, programmable key 5 overcomes one of the primary disadvantages of current merchandise security systems that use various types of keys since those keys can always be used at other retail stores having similar types of security devices, whether the key is a mechanically, electronically or magnetically actuated type of key.

A programmable key 5 according to present invention can only be used for a relatively short predetermined period of time by a thief or a dishonest employee, and only in the same retail store from which the key was stolen. The predetermined time period can be preset during manufacture, or alternatively, adjusted after manufacture to any desired time period, for example 24 hours, 36 hours, etc. without affecting the broad concept and intended scope of the invention. The 96 hour time period of the preferred embodiment shown and described herein has been found to be a time period that provides sufficient security without the SDC in the programmable key 5 having to be reprogrammed, or as also used herein "refreshed," often. However, security concerns in a particular retail store may require the programmable key 5 to time-out and have to be refreshed after each shift of a store employee, for example after only 8 hours. Again, the transmission of the SDC between programming station 3 and programmable key 5, and subsequently between the key and alarm module 7, is by wireless communication in the preferred embodiment of the security system 1 and associated method shown and described in FIGS. 1-10, and preferably, programming station 3, programmable key 5 and alarm module 7 each utilize a compatible infrared (IR) system for communicating the SDC and other data necessary for operation of the security system 1, Counter 83 of the logic control circuit 77 of programmable key 5 counts each time that activation switch 85 is actuated whether when being programmed (or refreshed) with the SDC from programming station 3 or when arming or disarming an alarm module 7. After a predetermined maximum number of activations of activation switch 85, counter 83 will cause logic control circuit 77 to invalidate use of the SDC in SDC memory 81, thereby rendering key 5 inoperative for further use with alarm module 7. For example, controller 80 of logic control circuit 77 may prevent communication circuit 79 from transmitting the SDC from SDC memory 81. Alternatively, the SDC may be erased from SDC memory 81 so that it is no longer available for use with alarm module 7. Regardless, invalidating use of the SDC ensures that the internal battery 75 always has a sufficient charge remaining for transmission of the SDC between the programmable key 5 and the programming station 3, or alternatively, between the key and the alarm module 7.

In order to disarm alarm module 7, a programmable key 5 programmed with a valid SDC that is still within the active predetermined time period is placed into the key receiving port 65 of the alarm module, as shown in FIG. 5, and activation switch 85 is energized by depressing the flexible member 87 on the key. Communication circuit 50 of alarm module 7 and communication circuit 79 of programmable key 5 communicate with one another to deactivate alarm 51, thereby enabling cable 11 and any associated sensor to be removed from an item of merchandise 9 for sale of the merchandise to a customer, or enabling cable 11 to be removed from the connection jack 63 of the alarm module for attaching a new or different type of merchandise to the alarm module. The programmable key 5 may then be used to re-arm the alarm module 7 by again presenting the key to the key receiving port 65 on the alarm module and depressing the flexible member 87 to energize the activation switch 85. Again, key LED 90 and alarm module LED 61 will flash in a predetermined pattern to indicate that disarming has occurred and then subsequently that arming has reoccurred. As previously mentioned, in order to disarm and re-arm alarm module 7, the SDC memory 53 of the alarm module must read the same SDC that was randomly generated by the programming station 3 and programmed into the programmable key 5 and subsequently provided by the key to the alarm module. If a SDC is sensed by alarm module 7 that is different than the one stored in SDC memory 53, controller 49 of alarm module 7 will sound alarm 51 to indicate that an invalid programmable key 5 has been used. Likewise, if the SDC has been invalidated or erased from the programmable key 5 by timer 82, the key will not operate to disarm the alarm module 7 and alarm module LED 61 will flash in a predetermined pattern to indicate that disarming has not occurred and that an invalid or uuencoded programmable key 5 is being used. Likewise, an invalid or uuencoded key 5 cannot be used to arm the alarm module 7.

As best shown in FIG. 6, the formation of sound space 42 and its direct communication with audible alarm 51 will provide a greater dB level for the same size alarm than that which occurs in an alarm module 7 wherein the audible alarm is mounted entirely within the housing 35 of the alarm module. Alarm module 7, and in particular logic control circuit 46, contains a lifetime or end of life (EOL) timer 97 that is actuated when alarm module 7 is first energized. The EOL timer 97 is preset at the factory for a specific time period, for example between about three and about five years, depending upon the particular size of internal battery 44 provided with the alarm module 7. At the end of the lifetime time period, control logic circuit 46 will deactivate alarm module 7 to prevent it from being subsequently armed with a SDC. In this manner, the internal battery 44 is certain to have sufficient power throughout the useful lifetime of the alarm module 7. Furthermore, the logic control circuit 46 of the alarm module 7 is provided with a counter 98 that records the length of time that alarm 51 is actuated since activating the alarm results in additional drain to the charge of the internal battery 44. The alarm time is then subtracted from the EOL time period according to a predetermined calibration formula. In this manner the internal battery 44 is certain to have sufficient power to satisfactorily operate alarm module 7 even though the alarm 51 has been used.

A near end-of-life (NEOF) feature is also provided in logic control circuit 46 that will again provide a visual signal, such as a predetermined flashing pattern of LED 61 and/or a non-alarming sound from alarm 51, when the EOL time period is approaching, for example five days before the EOL timer 97 completely inactivates operation of the alarm module 7.

Figure 11:
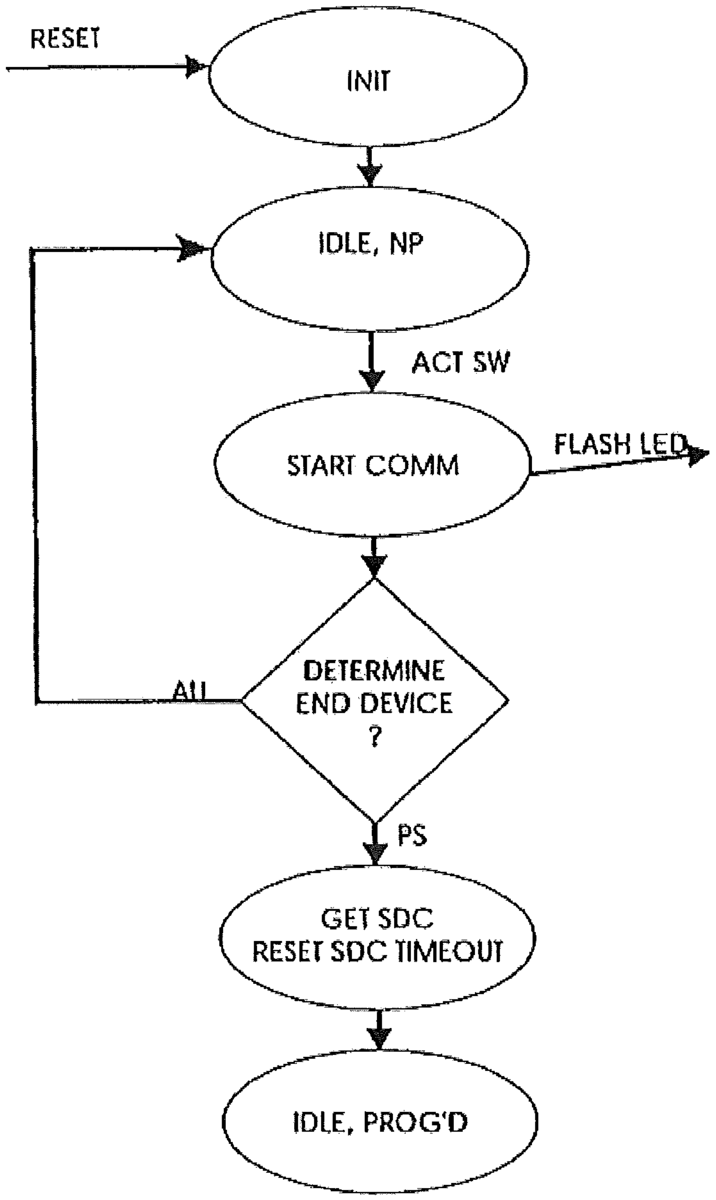
FIGS. 11, 11A and 11B are a flow chart depicting the operation of the logic control circuit of the programmable key shown in FIG. 8.
Figure 11A:
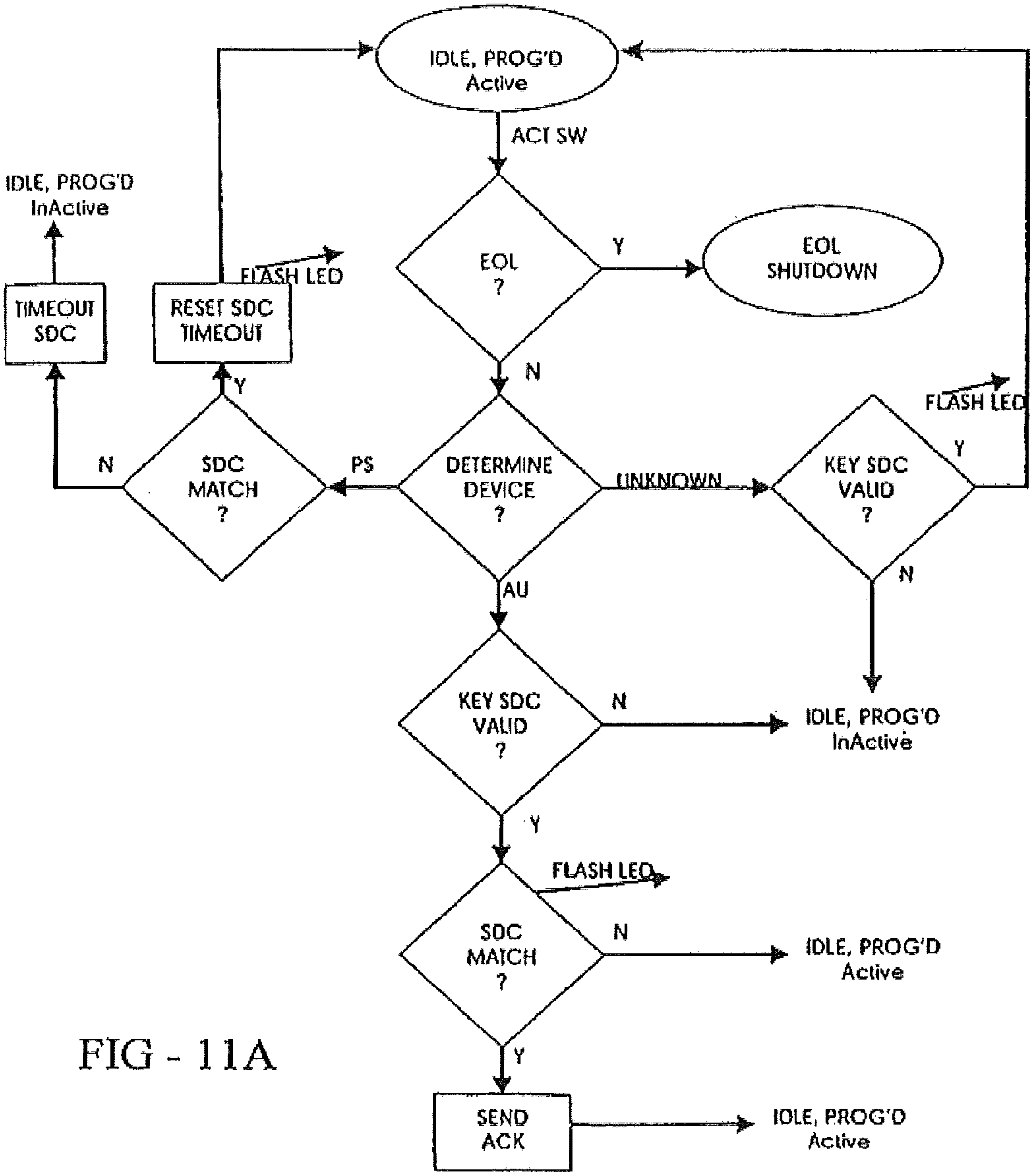
Figure 11B:
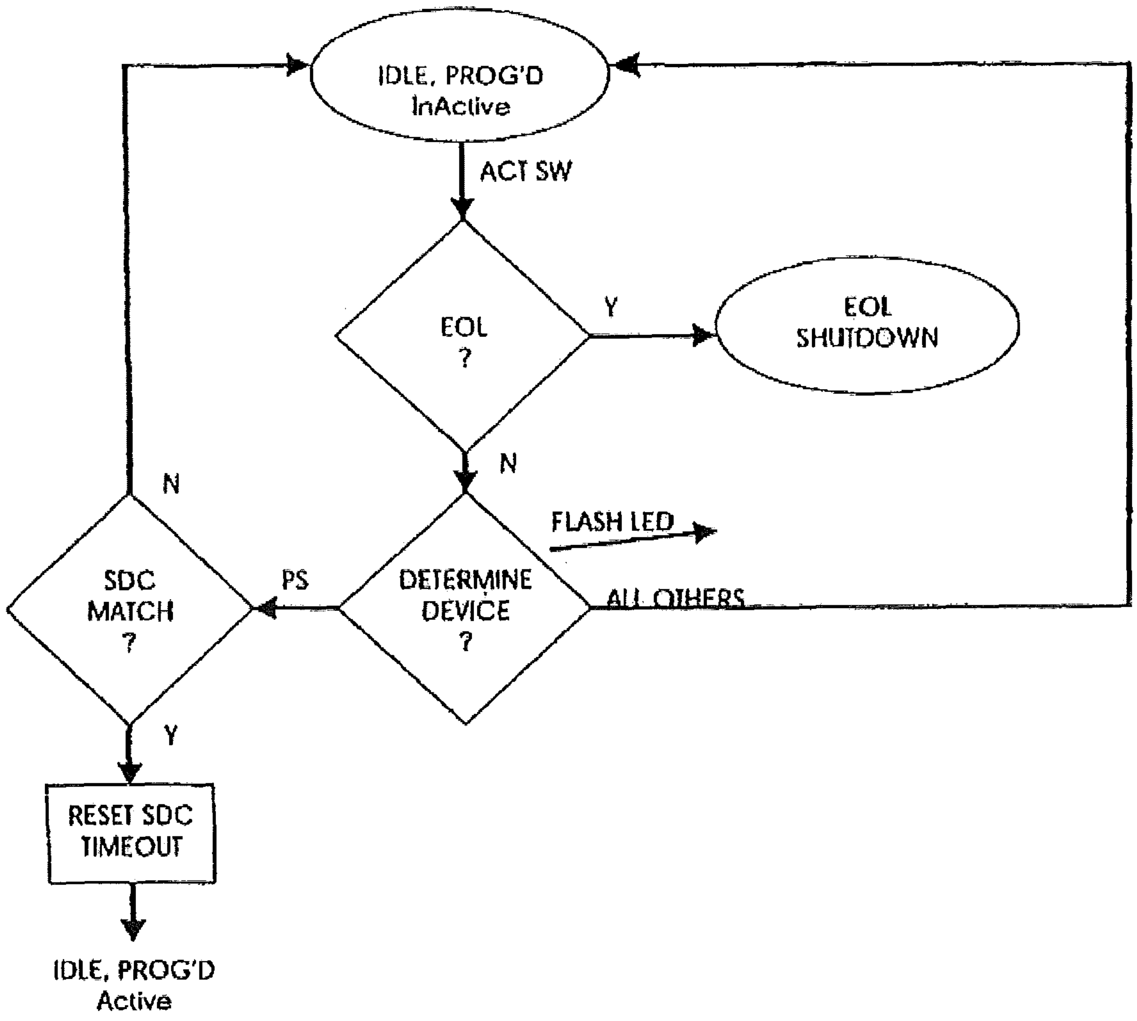
Figure 12:
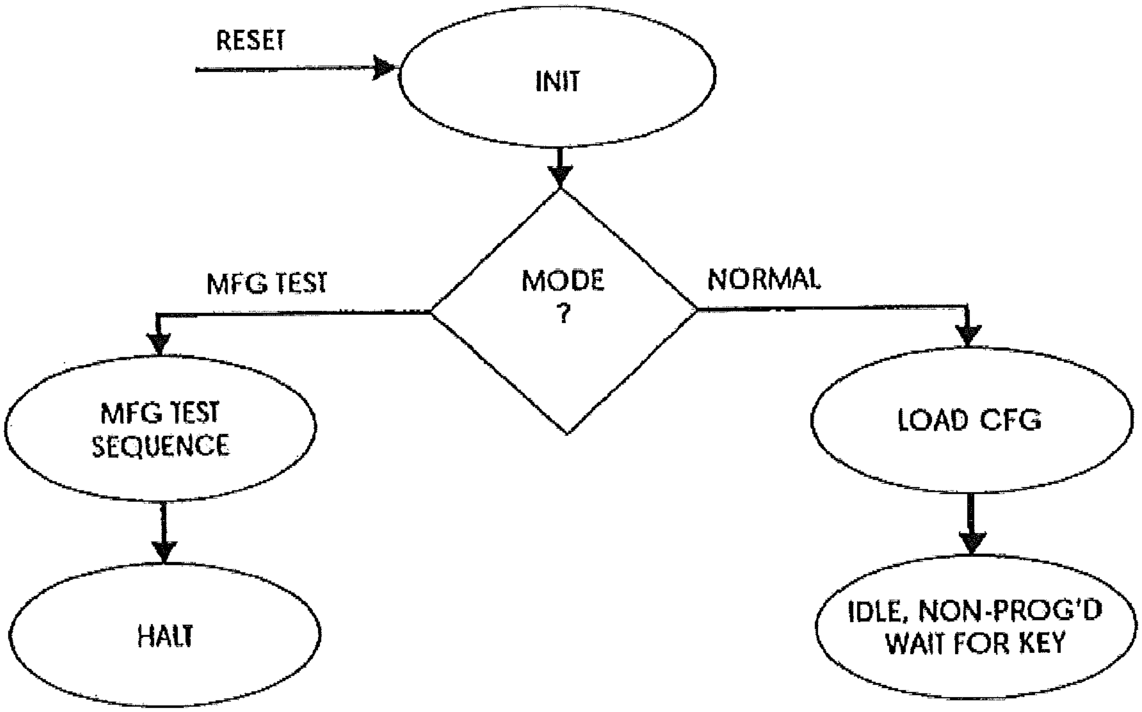
FIGS. 12, 12A and 12B are a flow chart depicting the operation of the logic control circuit of the programming station shown in FIG. 2.
Figure 12A:
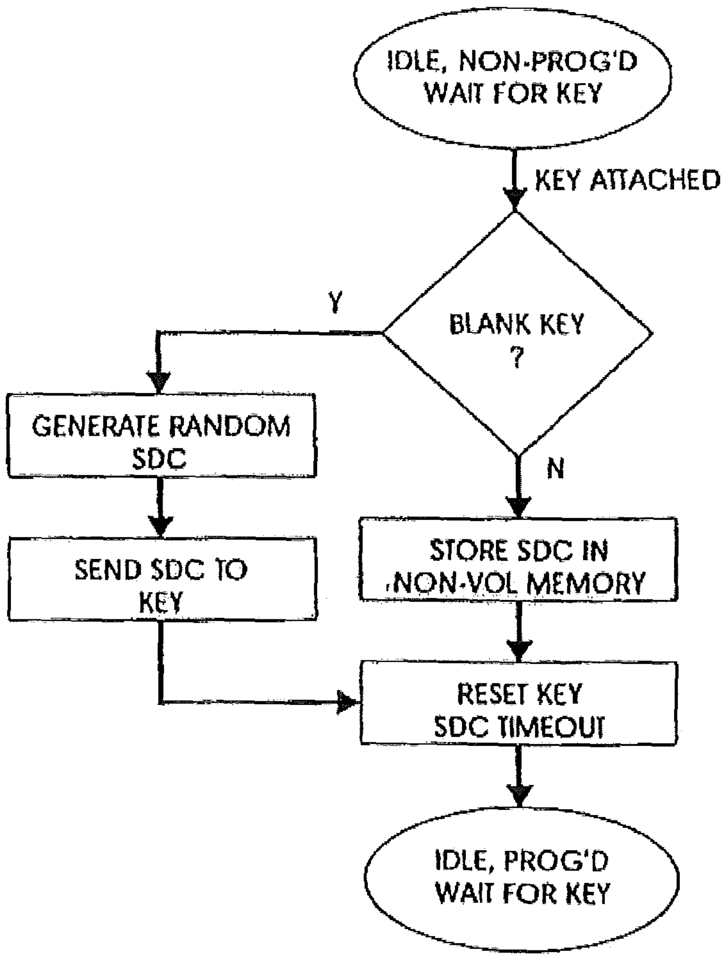
Figure 12B:
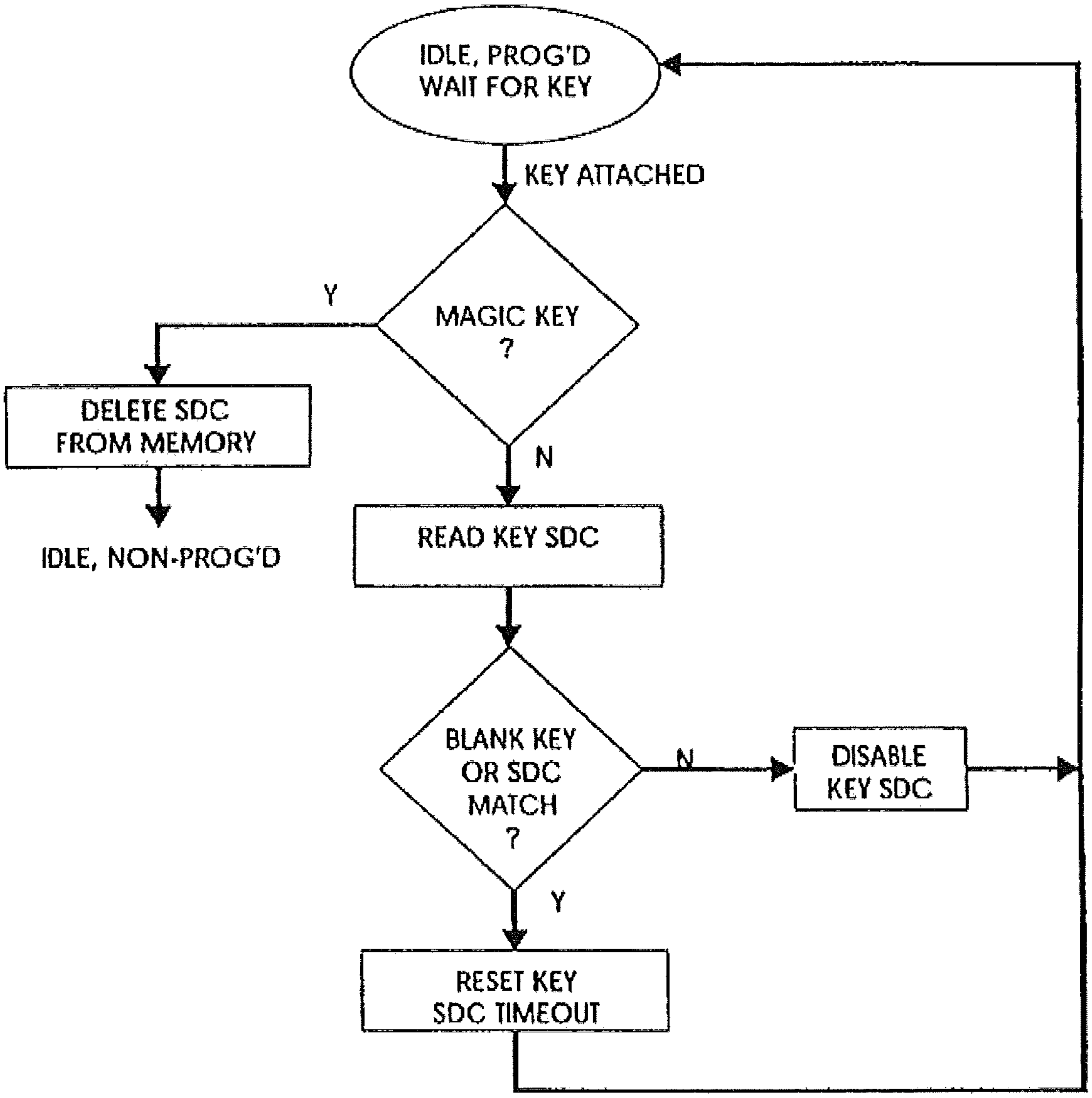
Figure 13:
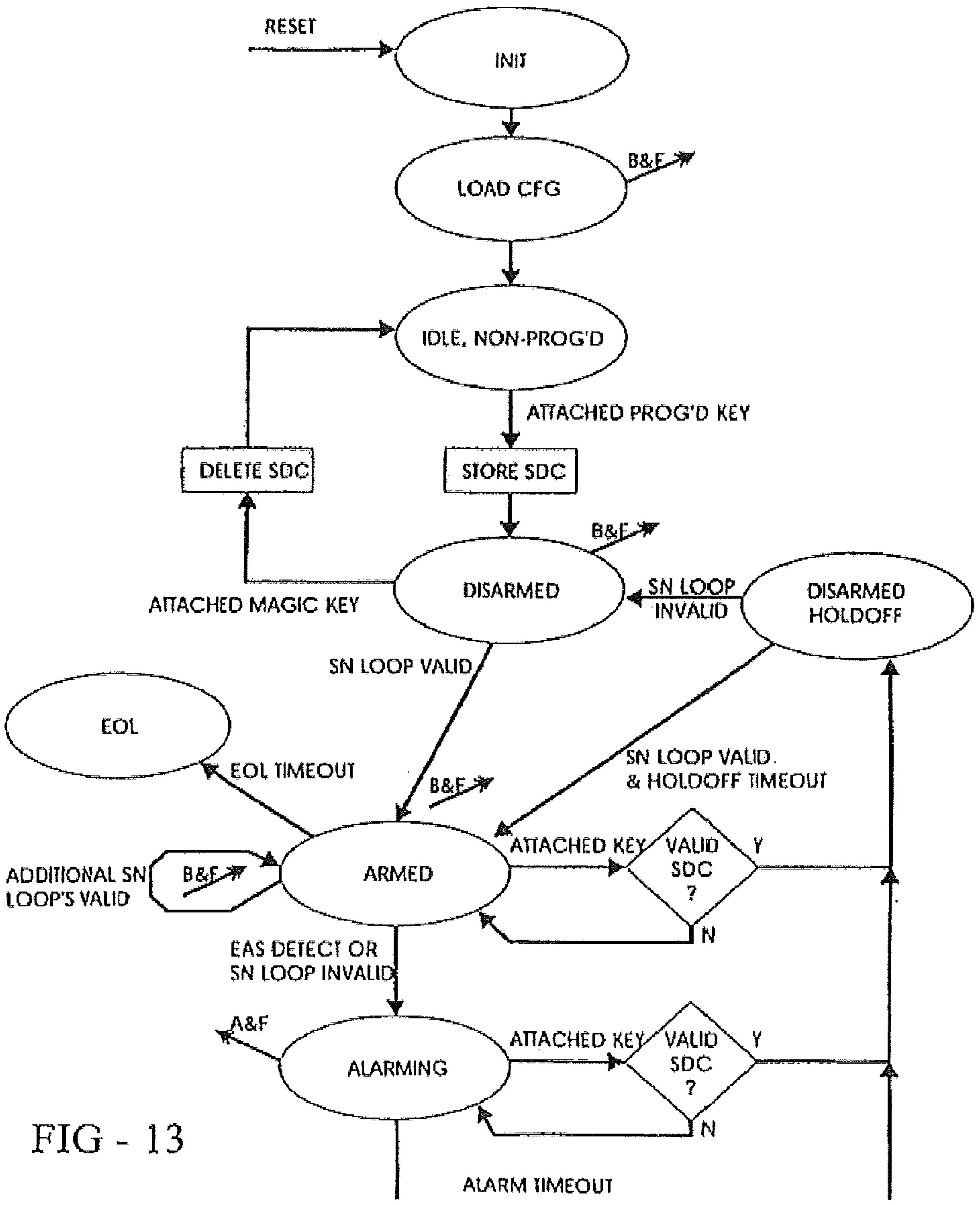
FIG. 13 is a flow chart depicting the operation of the logic control circuit of the security device shown in FIG. 5.

Further details of the operation of logic control circuit 77 of programmable key 5 are shown in flow chart form in FIGS. 11, 11A and 11B. FIGS. 12, 12A and 12B shows in flow chart form additional details of the manner and method of operation of the logic control circuit 18 of programming station 3. FIG. 13 illustrates in flow chart form the manner of operation of the logic control circuit 46 of alarm module 7. The sequence of events and actions taken by the various components shown in the flow charts the aforementioned figures will be readily understood and appreciated by those skilled in the art, and thus, are not explained in greater detail herein.

Figure 14:
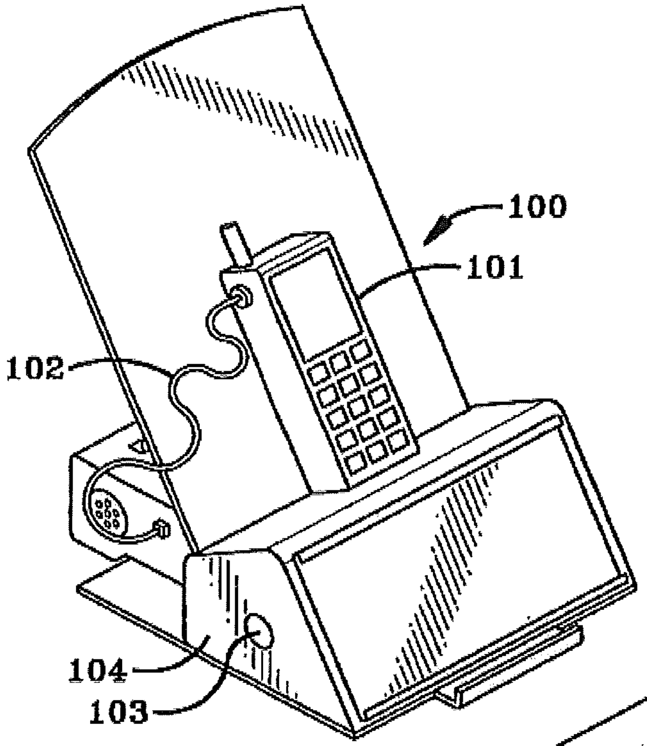
FIGS. 14-17 are diagrammatic views of other security devices for use with the security system of FIG. 1.
Figure 15:
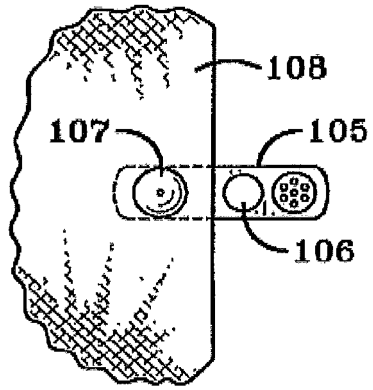
Figure 17:
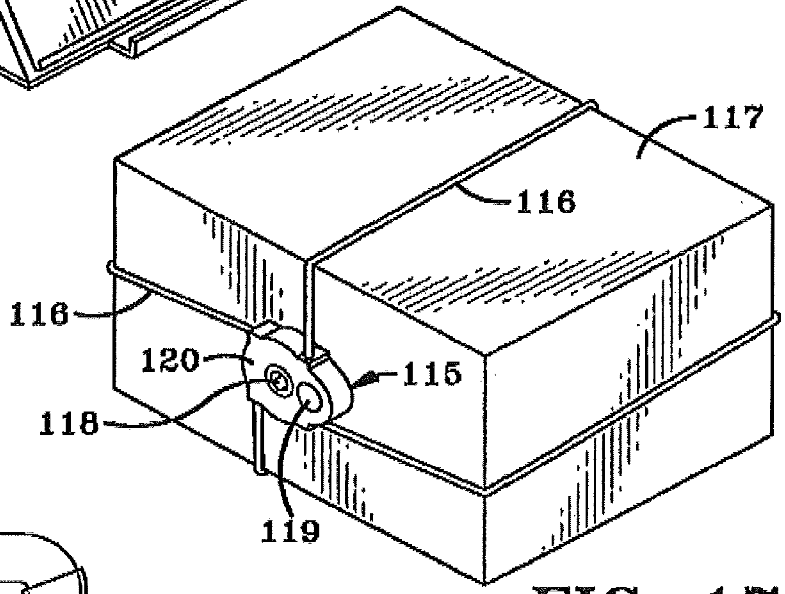
Figure 16:
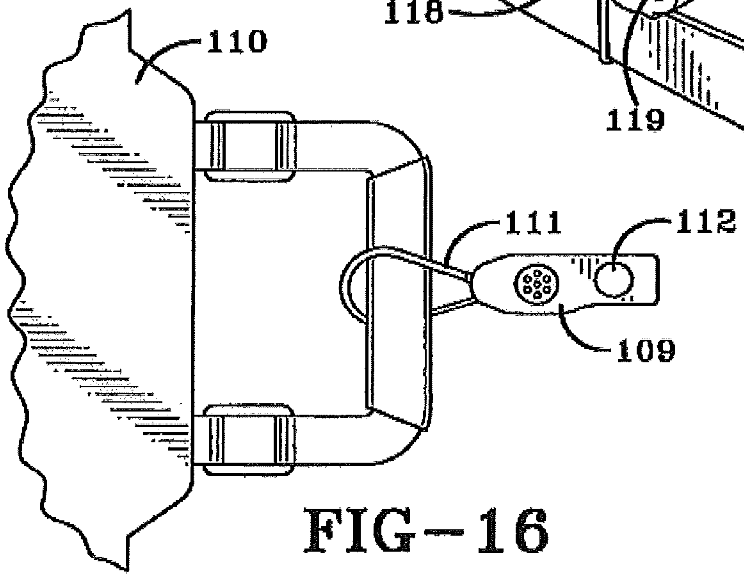

FIGS. 14-17 show examples of other types of security devices that could be used in a security system and method according to the present invention. FIG. 14 shows a product display security device indicated generally at 100 for displaying and protecting an item of merchandise 101 attached to a cable 102 containing a sense loop. A key receiving port 103 is formed in the housing 104 of the security device 100. When a programmable key 5 of the type previously described is inserted into key receiving port 103, the security device 100 is initially programmed with the SDC from the key and armed so that the key is available to subsequently disarm the security device. FIG. 15 shows a garment tag security device 105 formed with a key receiving port 106 that is used with a programmable key 5 of the type previously described to deactivate the security tag and thereby enable a pin alarm 107 to be removed from an attached garment 108. FIG. 16 shows a cable alarm security device 109 connected about an item of merchandise 110 by a cable 111 containing a sense loop. A key receiving port 112 is formed in the security device 109 to deactivate a lock mechanism (not shown) retaining the cable 111 to thereby enable the security device to be removed from the item of merchandise 110 being protected. Still another type of security device, indicated generally at 115, is shown in FIG. 17. Security device 115 includes a plurality of cables 116 that extend around an item 117 to be protected. It will be readily understood and apparent to those skilled in the art that cables 116 preferably contain sense loops and are tightened about package 117 by a ratchet or similar tightening mechanism 118. A key receiving port 119 is provided in a housing 120 that contains a logic control circuit (not shown) mounted therein with the tightening mechanism 118. FIGS. 14-17 merely show other examples of how a security system of the present invention and its method of operation can be utilized, and further, that the security device for use with the security system need not be limited to the particular alarm module 7 shown and described herein.

In summary, a security system and method according to the present invention can be configured for use in, for example, retail stores. The security system and method utilizes a programmable key as a primary component that even if stolen, cannot be used in the same retail store from which it was stolen after a predetermined time period to disarm an alarm module or other security device. Furthermore, the programmable key cannot be used in another retail store having the same type of security system to disarm an alarm module or other security device since it is programmed with a randomly generated SDC unique to that particular retail store, and the SDC is initially randomly generated by a programming station used only by that particular retail store. The programmable key includes an internal timer that will deactivate a key with a valid SDC after a predetermined time period, thereby rendering the key inoperative after the time period even in the same retail store in which the key was programmed. The programmable key must be returned to the same programming station, which can be maintained in a secure location, to enable an authorized person to reprogram or refresh the SDC into the key for subsequent use with the alarm modules or other security devices within the retail store that have been programmed from a programmable key that was previously programmed by the programming station with the unique SDC for that retail store. The programming station, programmable key and alarm module or other security device may each have various types of visual indicators and/or alarms for advising an authorized person of the status of these components and that will alert store personnel if an item of merchandise and/or the alarm module are tampered with. Furthermore, the programming station will deactivate a SDC stored in the SDC memory of a key if an incorrect SDC is encountered when the programming station is attempting to reprogram or refresh the key. Also, the alarm module or other security device will sound an alarm if a programmable key containing an incorrect SDC is attempted to be used with the alarm module. In addition to these features, each of the individual components may have various timing circuits, control circuits and visual indicating circuits all of which are part of the internal logic control circuits contained in the components, as shown and described in further detail in the aforementioned United States patents, the entire disclosures of which are incorporated herein by reference.

Another feature that may be incorporated into the present invention is the use of a "master" key and "employee" key(s) in order to provide an additional layer of security to the security system of a particular retail store. In this dual key system, the random number generator contained in the logic control circuit of the programming station will only generate the security code (i.e. SDC) when the master key is presented to the station and a limited access switch is activated. The master key can then be used to program the SDC into the desired alarm modules and other security devices in addition to the employee key(s) that are subsequently programmed with the SDC by the programming station after the SDC is generated using the master key.

Use of the master key enables an authorized person to change the SDC of the programming station that is subsequently used by the employee key(s) to arm and disarm the alarm modules and other security devices throughout the retail store for any reason, including for example, if the original SDC is compromised. Should a new SDC be generated by the master key and then reprogrammed into the employee key(s), the logic control circuit of the alarm module or other security device will be provided with a means of recognizing both the old and the new SDC of a key when there is communication therebetween. In this manner, the alarm module or other security device is able to accept the new SDC to disarm the alarm module or other security device without activating the alarm, which would occur as described above when the logic control circuit identifies the use of a key programmed with an incorrect SDC.

The dual key system would increase the complexity of the logic control circuits in the programming station, programmable key(s) and alarm modules or other security devices, but would provide an additional layer of security should a retail store desire the increased level of security afforded by the ability to change the SDC. However, any of the embodiments of the security system and method described herein are believed to provide adequate security for protecting items of merchandise using only the programmable key.

Although the above description refers to the security code being a Security Disarm Code (SDC), it will be readily understood, appreciated and apparent to those skilled in the art that the security code can also be used to activate and control other functions and features of a security device, including for example without limitation, arming the security device (as mentioned above), unlocking the merchandise from the security device, shutting-off an alarm, providing other or additional commands to the security device, or transferring other or additional data to the security device, without departing from the broad concept and intended scope of the invention. Likewise, the components of the logic control circuits depicted in the block diagrams and flow charts of the accompanying drawings can easily be modified by one skilled in the art to achieve the same objectives, features or results. Also, the security code can be preset in the programming station at the factory or determined by an authorized person at the retail store, and if desired, can be changed thereafter by the authorized person without affecting the broad concept and intended scope of the invention.

Figure 18:
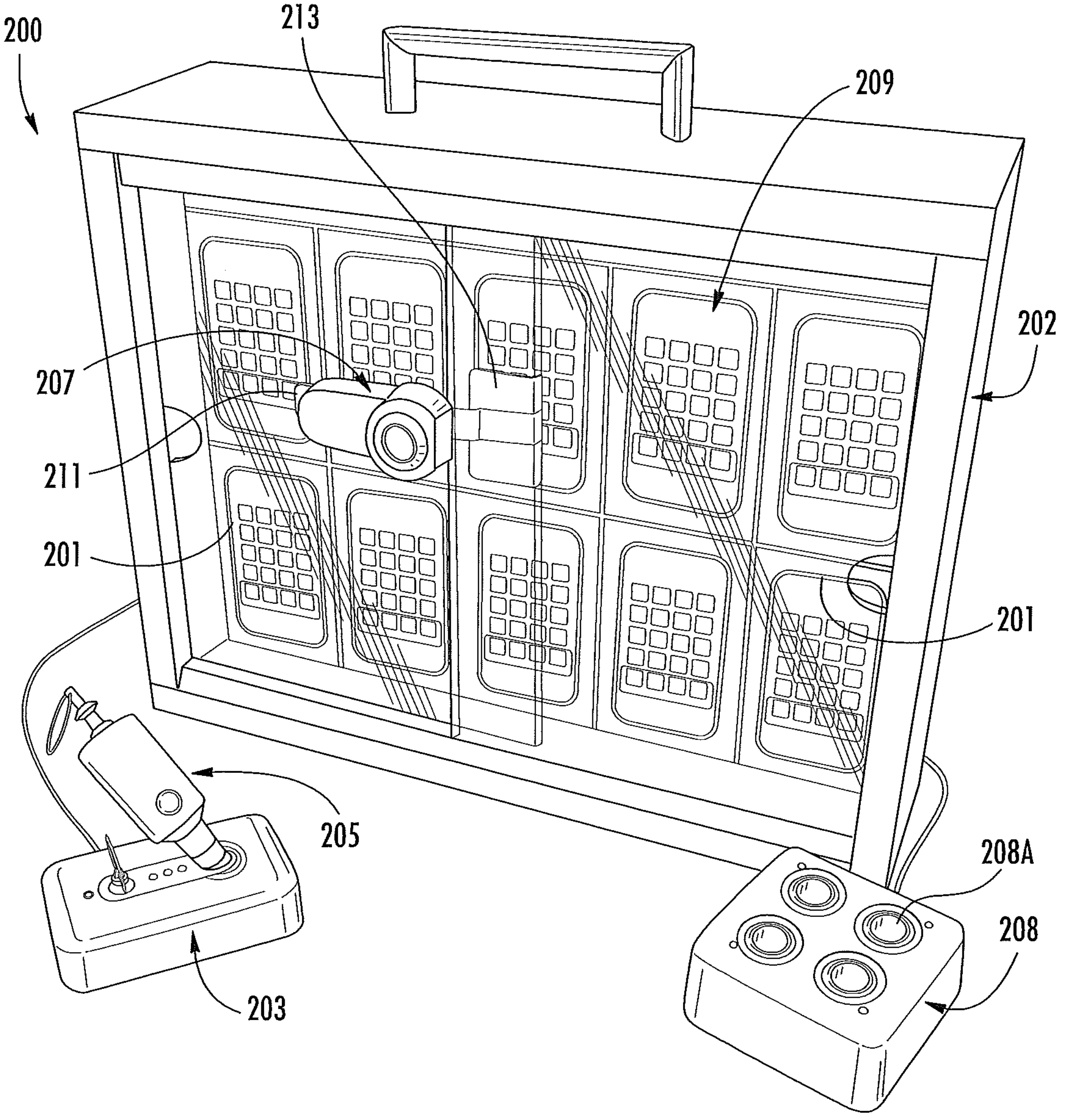
FIG. 18 is a diagrammatic view showing the components of another security system according to the present invention.

FIG. 18 shows another exemplary and preferred embodiment of a security system, indicated generally at 200, according to the present invention. Merchandise display security system 200 includes four primary components, a programming station indicated generally at 203, a programmable electronic key, indicated generally at 205, a merchandise security device, indicated generally at 207, that is operated by the key and an optional charging station, indicated generally at 208. Merchandise security devices 207 suitable for use with a security system and method according to the present invention include, but are not limited to, a security display (e.g. alarm module or display stand), a security fixture (e.g. hook, shelf, cabinet) and security packaging for an item of merchandise. The programmable electronic key 205 described herein is useable with any security device or locking device that utilizes power transferred from the key to operate an electronic lock mechanism, or alternatively, utilizes data transferred from the key (or transferred from the device to the key) to authorize the operation of a lock mechanism along with power transferred from the key to operate the lock mechanism. In other words, the programmable electronic key 205 is useable with any security device or locking device that requires power transfer from the key to the device, or alternatively, data transfer between the key and the device and power transfer from the key to the device.

The programming station 203 of the security system 200 is operable for programming the programmable electronic key 205 with a security code or Security Disarm Code (SDC), as previously described. The optional charging station 208 is operable for initially charging and/or subsequently recharging an internal power source disposed within the programmable electronic key 205. For example, key 205 and merchandise security device 207 may each be programmed with the same SDC into a respective permanent SDC memory. The programmable electronic key 205 may be provisioned with a single-use (i.e. non-rechargeable) power source, such as a conventional or extended-life internal battery. Preferably, however, the key 205 is provisioned with a multiple-use (i.e. rechargeable) power source, such as a conventional capacitor or rechargeable internal battery. In either instance, the internal power source may be permanent, semi-permanent (i.e. replaceable), or rechargeable, as desired. In the latter instance, charging station 208 is provided to initially charge and/or to subsequently recharge the power source provided within the programmable electronic key 205. Furthermore, the key 205 and/or the merchandise security device 207 may be provided with only a transient memory, such that the SDC must be programmed (or reprogrammed) at predetermined time intervals. In this instance, programming station 203 is provided to initially program and/or to subsequently reprogram the SDC into key 205. As previously described with respect to programmable key 5, the key 205 is operable to initially program and/or to subsequently reprogram the merchandise security device 207 with the SDC. The key 205 is further operable to operate the merchandise security device 207 by transferring power, by transferring data or, as described herein, by transferring both data and power to the merchandise security device.

Figure 19:
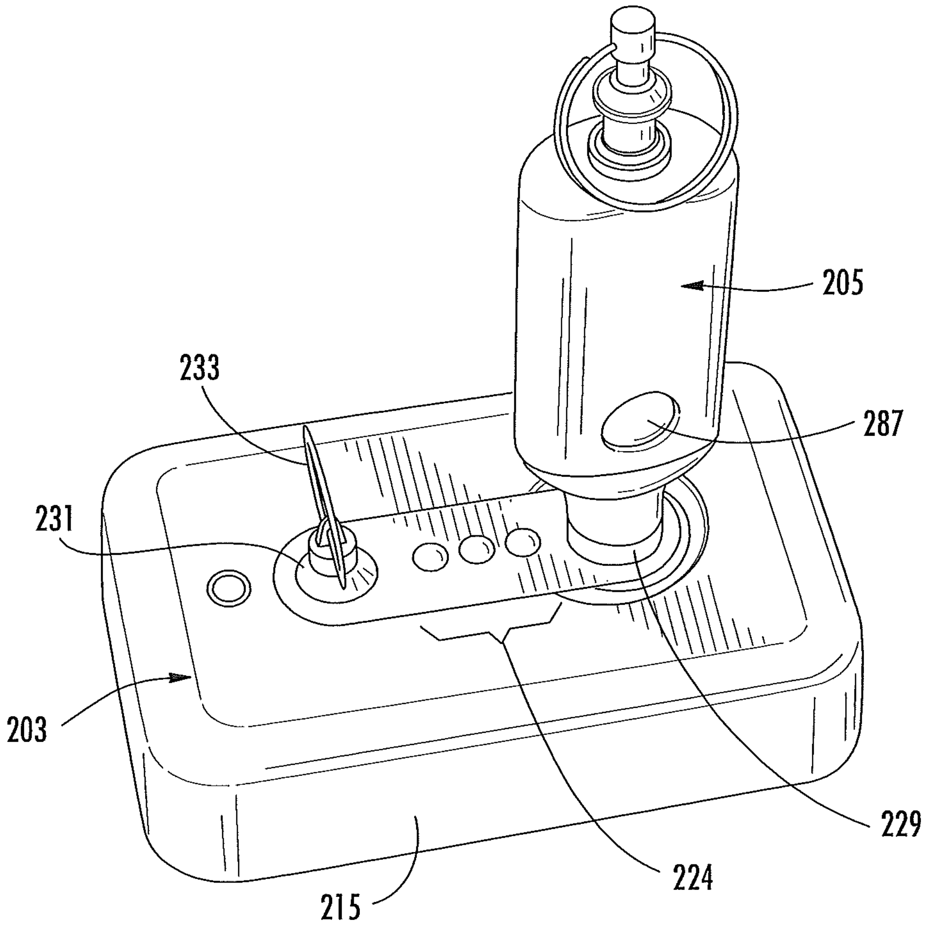
FIG. 19 is a diagrammatic view showing the programmable electronic key positioned on the programming station of the security system of FIG. 18 to be programmed with a security code.

As illustrated in FIG. 18 and shown enlarged in FIG. 19, the programmable electronic key 205 is presented to the programming station 203 and communication therebetween is initiated, for example by depressing a flexible member, such as a control button, 287 provided on the exterior of the key. In this exemplary and preferred embodiment, communication between the programming station 203 and the key 205 is accomplished directly by one or more electrical contacts, or alternatively, indirectly by wireless communication, as previously described with respect to programmable key 5.

Any form of wireless communication capable of transferring data between the programming station 203 and key 205 is possible, including without limitation optical transmission, acoustic transmission or magnetic induction. Preferably, data communication between the programming station 203 and the programmable electronic key 205 is accomplished by wireless optical transmission, and more particularly, by infrared (IR) transceivers provided in the programming station and the key, as previously described herein and described in greater detail in the aforementioned U.S. Pat. Nos. 7,737,844 and 7,737,845. Accordingly, further details of the infrared (IR) system for wireless data communication will not be repeated. For the purpose of describing this embodiment of the present invention, it is sufficient that the programming station 203 comprises a logic control circuit including at least a controller for generating a SDC, a SDC memory for storing the SDC, and a suitable wireless communication circuit for interfacing with the programmable electronic key 205 in the manner described herein.

As best shown in FIG. 19, programming station 203 comprises a housing 215 configured to contain the logic control circuit that generates the SDC, the SDC memory that stores the SDC, and the optical transceiver for wirelessly communicating the SDC to a corresponding optical transceiver disposed within the key 205. In use, the logic control circuit generates the SDC, which may be a predetermined (i.e. "factory preset") security code, but preferably is a random security code generated by the logic control circuit of the programming station 203 at the time a first programmable electronic key 205 is presented to the programming station for programming. In the latter instance, the logic control circuit further comprises an electronic random number generator for producing a unique SDC. A series of visual indicators, for example light-emitting diodes (LEDs) 224 may be provided on the exterior of the housing 215 for indicating the status of the programming station. Programming station 203 may further be provided with a lock mechanism, for example a conventional key-actuated tumbler switch 231 and mechanical key 233 for preventing use of the programming station by an unauthorized person, as previously described. Alternatively, the programming station 203 may be maintained within a locked enclosure to prevent access by an unauthorized person. As shown herein, the programming station 203 comprises an internal power source, for example an extended-life replaceable battery or a rechargeable battery, for providing power to the logic control circuit and LEDs 224. Alternatively, the programming station 203 may include a power cord for electrically connecting to an external power source.

The logic control circuit of the programming station 203 performs an exchange of data with a similar logic control circuit of the key 205, referred to herein as a "handshake," to determine whether the key has not previously been programmed with a SDC (i.e. a "new" key), or is an authorized key that is being presented to the programming station a subsequent time to refresh the SDC. In the event that the "handshake" fails for any reason, the programming station 203 will not provide the SDC to the device attempting to obtain the SDC, for example an infrared (IR) reader on a counterfeit key or other illegitimate device. When a proper "handshake" is completed, the programming station 203 permits the SDC generated by the logic control circuit and/or stored in the memory to be transmitted by the optical transceiver to the corresponding optical transceiver disposed within the programmable electronic key 205. As will be readily apparent and understood by those skilled in the art, alternatively the SDC may be transmitted from the programming station 203 to the programmable electronic key 205 by any suitable means, including without limitation, electrical contacts or electromechanical, electromagnetic or magnetic conductors, as desired.

Once programmed with the SDC, the programmable electronic key 205 is then available to operatively engage the merchandise security device 207. In the embodiment shown and described herein, the merchandise security device 207 is a conventional cabinet lock that has been modified to be operated by the programmable electronic key 205. Preferably, merchandise security device 207 is a passive device. As used herein, the term "passive" is intended to mean that the merchandise security device 207 does not have an internal power source to lock and unlock a physical lock mechanism disposed therein. Significant cost savings can be obtained by a retail store when the merchandise security device 207 is a passive device since the expense of an internal power source is confined to the programmable electronic key 205, and only one such key is required to operate multiple merchandise security devices. If desired, the merchandise security device 207 may also be provided with a temporary power source (e.g., capacitor or limited-life battery) having sufficient power to activate an alarm, for example a piezoelectric audible alarm, that is actuated by a security sensor in response to a security breach. The temporary power source may also be sufficient to transfer data, for example a SDC, from the merchandise security device 207 to the programmable electronic key 205 to authenticate the security device and thereby authorize the key to provide power to the merchandise security device. In contrast, the lock mechanism of existing merchandise security devices are operated mechanically, for example by a conventional key and tumbler, or magnetically, for example by a magnetic key of the type shown and described in United States Patent Application Publication No. 2008/0168811 entitled MAGNETIC KEY FOR USE WITH A SECURITY DEVICE, the entire disclosure of which is incorporated herein by reference. In the security system 200 of the present invention however, the lock mechanism of the merchandise security device 207 is operated by electrical power that is transferred from the programmable electronic key 205 to the merchandise security device, as will be described.

The merchandise security device 207 further comprises a logic control circuit similar to the logic control circuit disposed within the programming station 203 and the programmable electronic key 205 that performs a "handshake" with the logic control circuit of the key in essentially the same manner as the "handshake" performed between the programming station and the key. In particular, the logic control circuit of the key 205 determines whether the merchandise security device 207 is an authorized "new" security device not having a SDC, or is an authorized security device already having the SDC. In the event that the "handshake" fails for any reason, the programmable electronic key 205 will not provide the SDC to the merchandise security device 207 (i.e. will not initially program a new merchandise security device with the SDC). When the merchandise security device 207 is an authorized "new" device and a proper "handshake" is completed, the key 205 permits the SDC stored in the SDC memory of the key to be transmitted by the optical transceiver disposed within the key to a corresponding optical transceiver disposed within the security device 207 to be stored in a SDC memory of the device. As will be readily apparent to those skilled in the art, the SDC may be transmitted from the programmable electronic key 205 to the merchandise security device 207 by any suitable means, including without limitation, one or more electrical contacts or electromechanical, electromagnetic or magnetic conductors, as desired.

Figure 20:
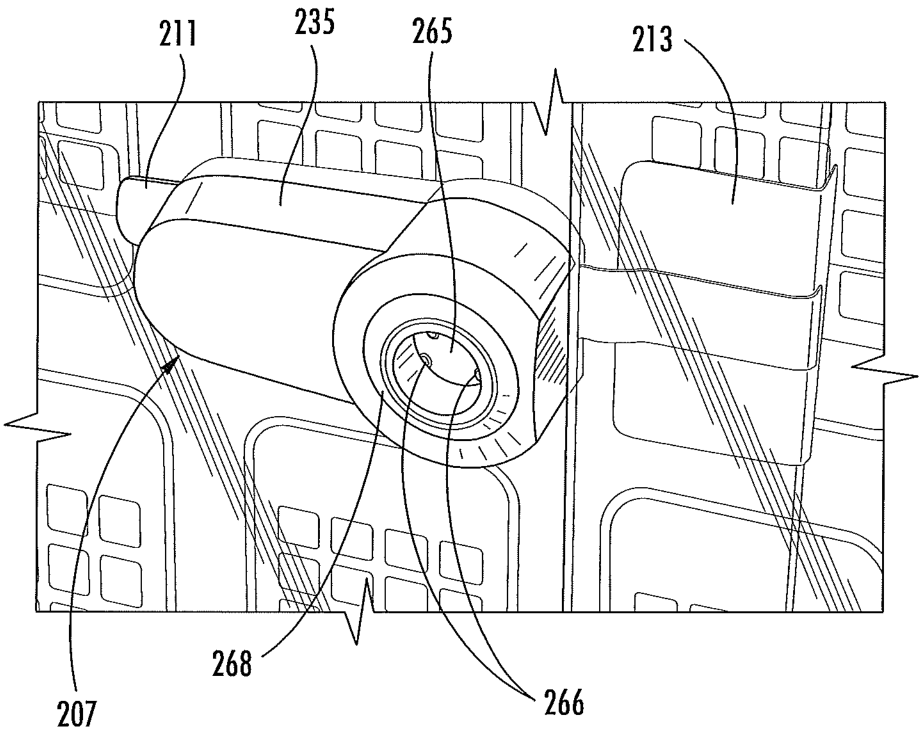
FIG. 20 is a diagrammatic view of a merchandise security device for use with the security system of FIG. 18.

On the other hand, when the merchandise security device 207 is an authorized device already having the SDC and a proper "handshake" is completed, the logic control circuit of the key 205 causes the internal power source of the key to transfer electrical power to the lock mechanism of the merchandise security device. More particularly, electrical contacts on the programmable electronic key 205 electrically coupled to corresponding electrical contacts on the merchandise security device 207 are energized to transfer power from the internal battery of the key to the merchandise security device to perform a mechanical operation, such as to lock or unlock the lock mechanism. In the embodiment shown and described herein, the merchandise security device 207 is a cabinet lock that is affixed to one of a pair of adjacent sliding doors 201 of a conventional cabinet 202 of the type suitable for use in a retail store. The cabinet 202 typically contains relatively expensive items of merchandise 209, such as mobile phones, digital cameras, Global Positioning Satellite (GPS) devices, and the like. The doors 201 overlap at the center of the cabinet 202 and the cabinet lock 207 is secured on a lock arm 211 extending from a lock bracket 213 affixed to the innermost door 201 behind the outermost door 201. In this embodiment, the programmable electronic key 205 transfers power to an electric motor, DC stepper motor, solenoid, or the like that unlocks the lock mechanism of the cabinet lock 207 so that the cabinet lock can be removed from the lock arm 211 of lock bracket 213 and the doors 201 moved (i.e. slid) relative to one another to access the items of merchandise 209 stored within the cabinet 202. As best shown in FIG. 20, the lock arm 211 is provided with one-way ratchet teeth and the cabinet lock 207 is provided with complimentary ratchet pawls in a conventional manner so that the programmable electronic key 205 is not required to lock the cabinet lock onto the lock arm on the innermost door 201 of the cabinet 202. If desired, however, the cabinet lock 207 can be configured to require use of the programmable electronic key 205 to both unlock and lock the cabinet lock.

FIG. 20 shows the exemplary embodiment of the merchandise security device 207 in greater detail. As previously mentioned, the merchandise security device 207 can be any type of security device (e.g. security display; security fixture; security packaging; conventional door/window/drawer lock; etc.) that utilizes both an electronic security mechanism, such as an alarm or an authorization "handshake," and a physical lock mechanism that locks and/or unlocks a conventional lock. At the same time, the merchandise security device 207 must be a "passive" device in the sense that it does not have an internal power source sufficient to operate the security mechanism or the lock mechanism. As a result, the merchandise security device 207 must be configured to receive power, and more preferably, both data and power, from an external source, such as the programmable electronic key 205 shown and described herein. The exemplary embodiment of the merchandise security device 207 depicted in FIG. 20 is a cabinet lock configured to be securely affixed to the lock arm 211 of the conventional cabinet lock bracket 213, as previously described. As previously mentioned, the cabinet lock 207 comprises a logic control circuit for performing a "handshake" with the logic control circuit of the programmable electronic key 205 and for receiving the SDC from the key. In other embodiments, the cabinet lock 207 may be configured to transmit the SDC to the programmable electronic key 205 to authenticate the cabinet lock and thereby authorize the key to transfer power to the cabinet lock. As previously mentioned, the data (e.g. "handshake" and SDC) may be communicated (i.e. transmitted and received) by electrical contacts, optical transmission, acoustic transmission or magnetic induction.

The cabinet lock 207 comprises a housing 235 sized and shaped to contain the logic control circuit disposed therein and a conventional internal lock mechanism (not shown). A key receiving port 265 formed in the housing 235 is sized and shaped to receive a transfer end 293 of the programmable electronic key 205, as will be described. At least one, and preferably, a plurality of magnets 266 are disposed within the key receiving port 265 for securely positioning and retaining the transfer end 293 of the key 205 in electrical contact with the logic control circuit of the cabinet lock 207 for providing power to the internal lock mechanism. In the particular embodiment shown and described herein, data is transferred from the programmable electronic key 205 to the cabinet lock 207 by wireless communication, such as infrared (IR) optical transmission, as previously described herein with respect to alarm module 7. Power is transferred from the programmable electronic key 205 to the cabinet lock 207 by electrical contacts disposed within the key receiving port 265 and disposed on the transfer end 293 of the key. For example, the key receiving port 265 may comprise a metallic outer ring 268 that forms one electrical contact, while the magnet(s) 266 form another electrical contact to complete an electrical circuit with the electrical contacts disposed on the transfer end 293 the programmable electronic key 205. Regardless, electrical contacts transfer power from the key 205 to the lock mechanism disposed within the housing 235 of the cabinet lock 207. As previously described, the power transferred from the key 205 may be used to unlock the lock mechanism, for example utilizing an electric motor, DC stepper motor, solenoid, or the like, so that the cabinet lock 207 can be removed from the lock arm 211 of the lock bracket 213.

It will be readily apparent to those skilled in the art that the cabinet lock 207 shown and described herein is but one of numerous types of a "passive" merchandise security device that can be configured to be operated by a programmable electronic key 205 according to the present invention. By way of example and without limitation, the merchandise security device may be a locking base for securing a merchandise display hook to a display support, such as pegboard, slatwall, bar stock or wire grid, or may be a locking end assembly for preventing the rapid removal of merchandise from the merchandise display hook. Alternatively, the merchandise security device may be a merchandise security alarm module or display stand comprising a lock mechanism for securing the alarm module or display stand to a display support, such as a table, countertop, desk, wall, or other fixed structure and/or a lock mechanism for securing an item of merchandise on the alarm module or display stand. Alternatively, the merchandise security device may be incorporated into security packaging for one or more items of merchandise including a lock mechanism for separating the packaging from the merchandise, or alternatively, for removing the merchandise from the packaging. Still further, the merchandise security device may be a conventional door or window security lock for preventing access to an enclosure, such as a room or closet. In any of these or other embodiments, the merchandise security device may further comprise an electronic lock mechanism in the form of a sensor, such as a conventional proximity, limit or contact switch, and an associated electronic monitoring circuit that activates an alarm in response to the sensor being actuated or the integrity of the sensor or monitoring circuit being compromised. Regardless, the merchandise security device preferably includes a logic control circuit, or the equivalent, including a SDC memory for storing a SDC, and a communication circuit for initially receiving the SDC from the programmable electronic key 205, and for subsequently facilitating data communication, including the SDC, between the programmable electronic key and the merchandise security device.

Figure 21:
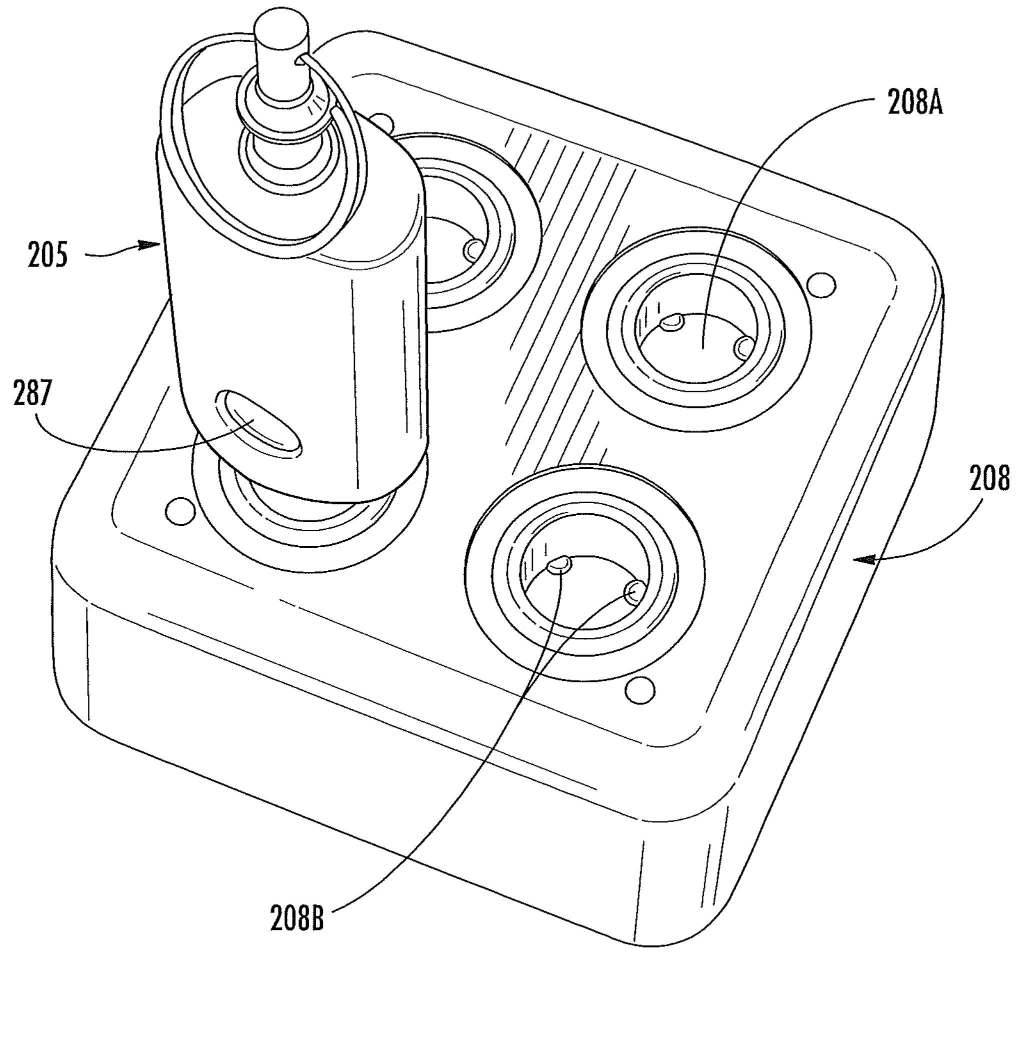
FIG. 21 is a diagrammatic view showing the programmable electronic key positioned on the charging station of the security system of FIG. 18 to recharge the internal battery of the key.

As shown in FIG. 21, the merchandise security system 200 further includes charging station 208 for initially charging and subsequently recharging a rechargeable battery disposed within the programmable electronic key 205. The charging station 208 comprises at least one, and preferably, a plurality of charging ports 208A each sized and shaped to receive a programmable electronic key 205. Charging port 208A comprises at least one, and preferably, a plurality of electrically conductive magnets 208B for securely positioning and retaining the key 205 within the charging port 208A in electrical contact with the electrical components of the charging station 208. As shown, the charging station 208 includes an internal power source, for example, an extended-life replaceable battery or a rechargeable battery, for providing power to one or more programmable electronic keys 205 positioned within a corresponding charging port 208A. Alternatively, charging station 208 may include a power cord having at least one conductor operatively connected to an external power source.

Figure 22:
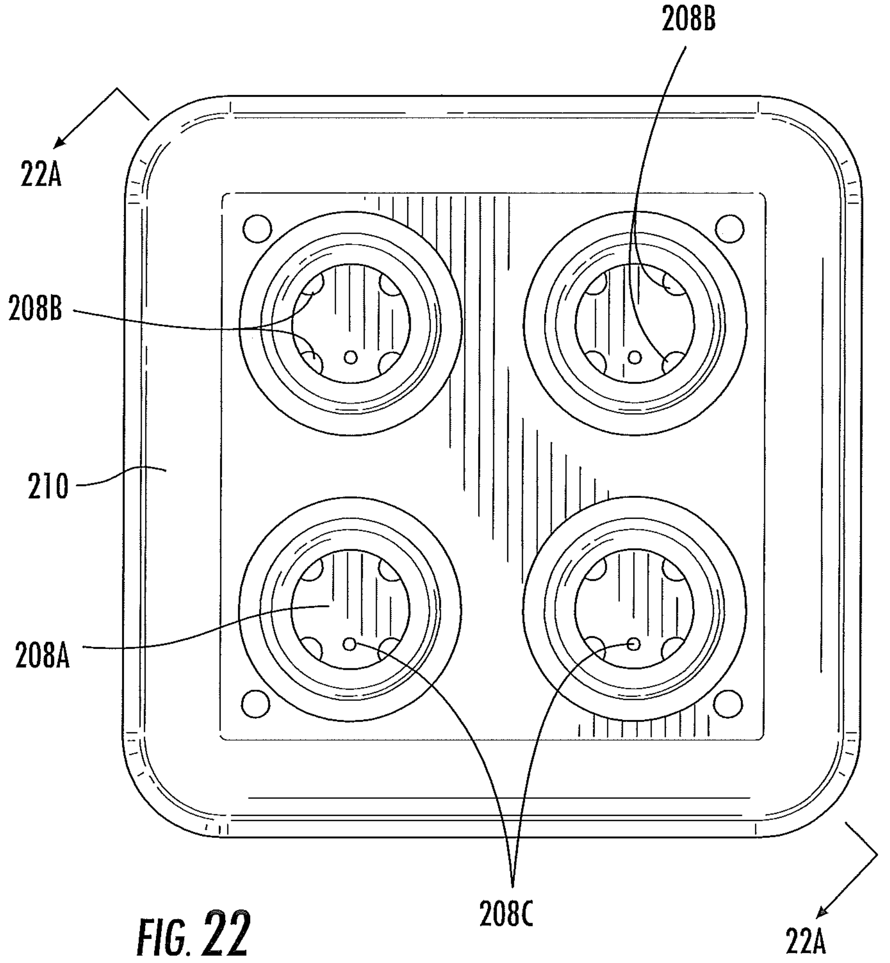
FIGS. 22 and 22A are top plan and diagrammatic sectional views, respectively, of the charging station of the security system of FIG. 18.
Figure 22A:
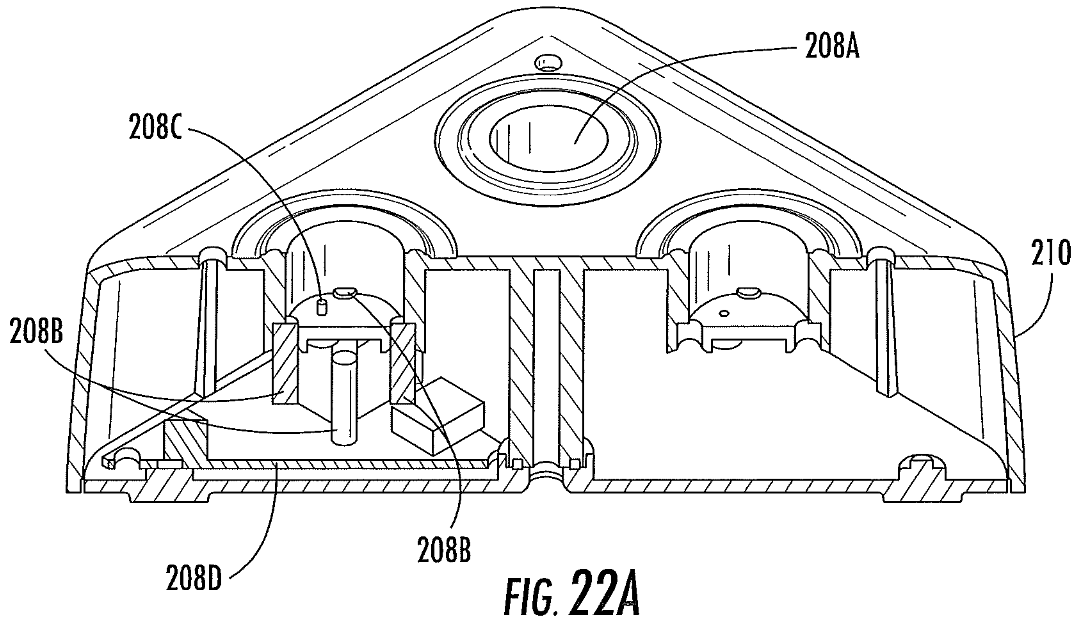

As previously mentioned, the charging station 208 recharges the rechargeable internal battery of the programmable electronic key 205, and in some instances deactivates the data transfer and/or power transfer capability of the key until the key is reprogrammed with the SDC by the programming station 203. As best shown in FIG. 22, the charging station 208 comprises a housing 210 for containing the internal components of the charging station. As previously mentioned, the housing 210 has at least one, and preferably, a plurality of charging ports 208A formed therein that are sized and shaped to receive the transfer end 293 of the programmable electronic key 205 and a plurality of electrically conductive magnets 208B are disposed within each charging port 208A. More particularly, electrical contacts provided on transfer end 293 of the programmable electronic key 205 are retained in electrical contact with the magnets 208B and a resilient "pogo" pin 208C made of a conductive material to complete an electrical circuit between the charging station 208 and the rechargeable internal battery of the key. Housing 210 contains a logic control circuit, similar to the logic control circuits of the programming station 203, the programmable electronic key 205 and the merchandise security device (i.e. cabinet lock) 207 previously described, in the form of a printed circuit board (PCB) 208D that is operatively coupled with and electrically connected to the magnets 208B and the pogo pin 208C of each charging port 208A. The pogo pin 208C is depressible to complete an electrical circuit as the magnets 208B position and retain the electrical contacts disposed on the transfer end 293 of the programmable electronic key 205 within the charging port 208A. In particular, magnets 208B make electrical contact with an outer ring electrical contact on the transfer end 293 of the key 205, while pogo pin 208C makes electrical contact with an inner ring electrical contact on the transfer end of the key. Once pogo pin 208C is depressed and the electrical circuit between the charging station 208 and the programmable electronic key 205 is closed, the charging station recharges the internal battery of the key. As previously mentioned, charging station 208 includes an internal power source, for example, an extended-life replaceable battery or a rechargeable battery, for providing power to the key(s) 205 positioned within the charging port(s) 208A of the charging station. Alternatively, the electrical components of the charging station 208 are electrically connected to an external power source by a power cord having at least one conductor. Furthermore, logic control circuit 208D may be operable for deactivating the data communication and/or power transfer functions of the programmable electronic key 205, or alternatively, for activating a "time-out" feature of the key until it is reprogrammed or refreshed by the programming station 203, as previously described.

Figure 23:
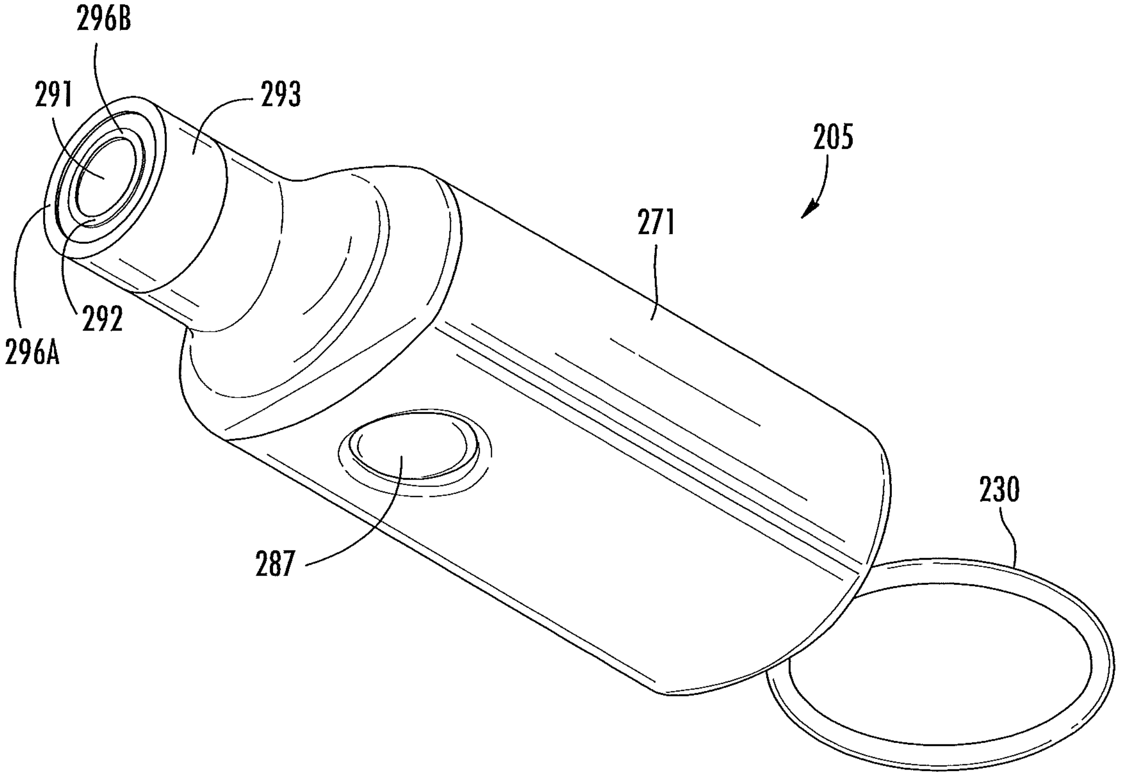
FIG. 23 is a diagrammatic sectional view of the programmable electronic key of the security system of FIG. 18.
Figure 24:
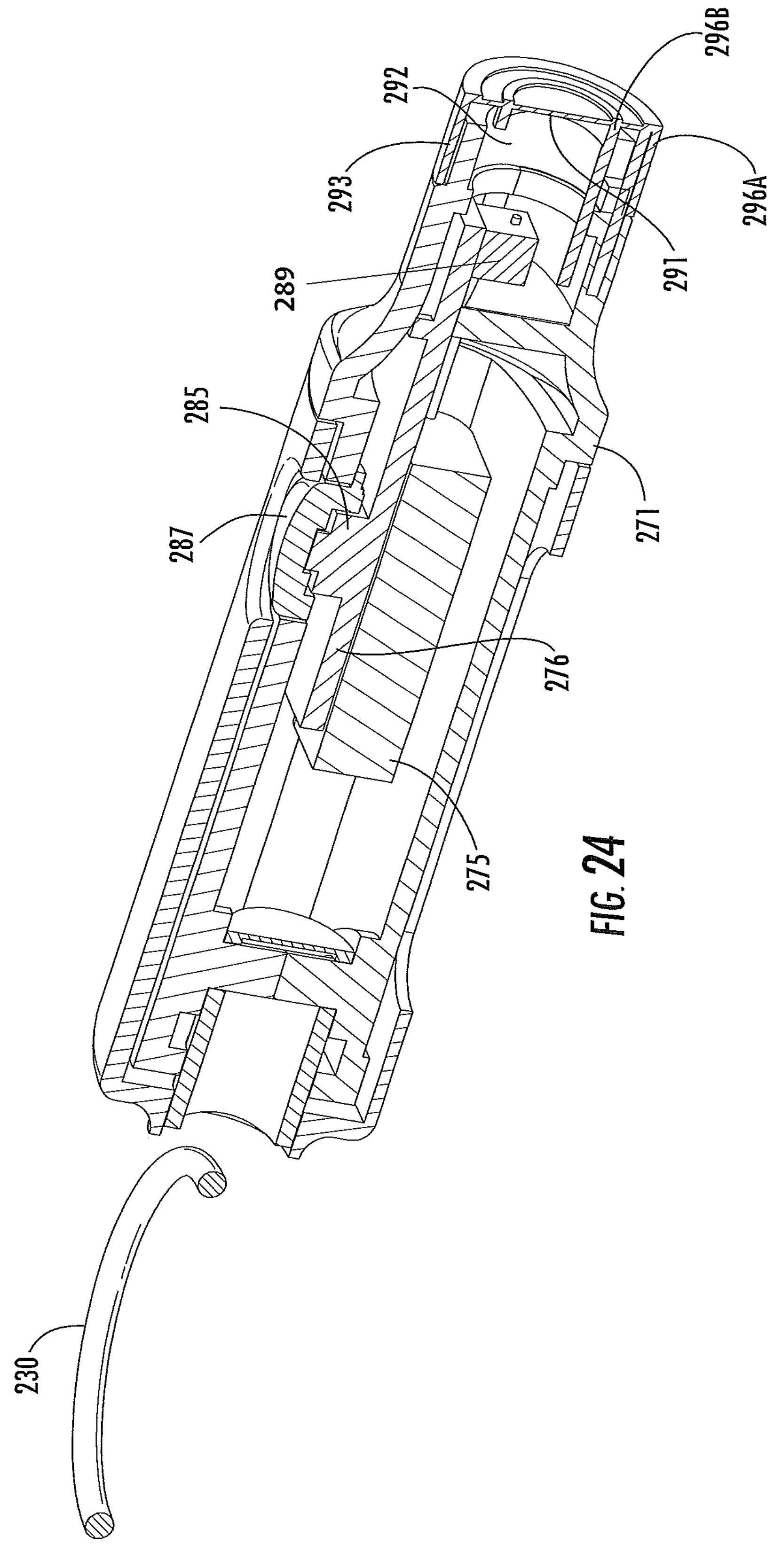
FIG. 24 is a diagrammatic sectional view of the programmable electronic key of the security system of FIG. 18.

FIGS. 23 and 24 show the programmable electronic key 205 in greater detail. As previously mentioned, the key 205 is configured to transfer both data and power to a merchandise security device 207 that comprises a physical lock mechanism or alternatively, an electronic lock mechanism (e.g. an alarm or "handshake" security) and a physical lock mechanism. Accordingly, the key 205 must be an "active" device in the sense that it has an internal power source sufficient to operate the lock mechanism(s) of the merchandise security device 207. As a result, the key 205 must be configured to communicate data and to transfer power from an internal source, such as a logic control circuit (i.e. data) and a battery (i.e. power) disposed within the key. The exemplary embodiment of the programmable electronic key 205 shown and described herein is configured to be received within the key receiving port 29 of the programming station 3 (FIG. 2) or the key receiving port 229 of the programming station 203 (FIG. 19), as well as the key receiving port 65 of the alarm module 7 (FIG. 5) or the key receiving port 265 of the cabinet lock 207 (FIG. 20), as well as the charging port 208A of the charging station 208 (FIG. 21 and FIG. 22). The logic control circuit of the programmable electronic key 205 performs a "handshake" with the logic control circuit of the programming station 3, 203 to receive the SDC from the programming station, as previously described, and further performs a "handshake" with the logic control circuit of the alarm module 7 or merchandise security device (cabinet lock) 207 to transfer the SDC to the merchandise security device, as previously described. In the embodiments shown and described herein, the data (e.g. "handshake" and SDC) is communicated by wireless communication using an infrared (IR) system.

As best shown in FIG. 23, the programmable electronic key 205 comprises a housing 271 that contains the internal components of the key 205, including without limitation the printed circuit board and the internal battery, as will be described. The programmable electronic key 205 may optionally include a detachable "quick-release" type key chain ring 230. The programmable electronic key 205 further comprises transfer end 293 located at an end of the housing 271 opposite the key chain ring 230 for transferring data and power to the merchandise security device 207, as previously described. The transfer end 293 also transmits and receives the "handshake" and the SDC from the programming station 203, as previously described, and receives power from the charging station 208, as previously described. As best shown in FIG. 24, an internal battery 275 and a logic control circuit formed on a printed circuit board (PCB) 276 are disposed within the housing 271 of the programmable electronic key 205. Battery 275 may be a conventional extended-life replaceable battery, but preferably, is a rechargeable battery suitable for use with the charging station 208. The logic control circuit on the printed circuit board 276 is operatively coupled and electrically connected to an activation switch 285 that is actuated by the control button 287 provided on the exterior of the housing 271 of the key 205. Control button 287 in conjunction with activation switch 285 controls certain operations of the logic control circuit, and in particular, transmission of the data (i.e. "handshake" and SDC) to the merchandise security device 207. In that regard, the logic control circuit further includes an infrared (IR) system similar to wireless communication circuit 79 of programmable key 5 for transmitting and receiving the "handshake" and SDC data. In the exemplary embodiment shown and described herein, the wireless infrared (IR) system includes an optical transceiver 289 for transmission of data between the programmable electronic key 205 and the programming station 203, and between the key and the merchandise security device 207. The transfer end 293 of the key 205 is provided with an optically transparent or translucent lens 291 mounted in an opening 292 of the transfer end. Lens 291 preferably is a visible light filter to enhance the transmission and reception of infrared (IR) waves when the programmable electronic key 205 interacts with a similar light filter lens provided within key receiving port 229 of programming station 203 and key receiving port 265 of merchandise security device 207 for emitting and collecting optical transmissions between the key 205 and the programming station or merchandise security device. Transfer end 293 further comprises a pair of bi-directional electrical contacts 296A, 296B made of an electrically conductive material for transferring power to the merchandise security device 207 and/or receiving power from the charging station 208, as previously described. Accordingly, power transfer electrical contacts 296A, 296B are electrically connected to battery 275, and are operatively coupled and electrically connected to the logic control circuit on printed circuit board 276 in any suitable manner, for example by conductive insulated wires, plated conductors or the equivalent.

The logic control circuit of the programmable electronic key 205 may include a time-out feature as previously described with respect to programmable key 5. More particularly, the ability of the key 205 to communicate data and transfer power to the merchandise security device 207 may be deactivated or invalidated after a predetermined time period. By way of example, the logic control circuit of the programmable electronic key 205 may be deactivated after about 6 hours to about 12 hours from the time the key was programmed or last refreshed by the programming station 203. In this manner, an authorized person typically must reprogram or refresh the programmable electronic key 205 assigned to him at the start of each work shift. Furthermore, the charging station 208 may be configured to deactivate the logic control circuit of the programmable electronic key 205 when the key is positioned within a charging port 208A. In this manner, the charging station 208 can be made available to an authorized person in an unsecured location without concern that a charged key 205 could be removed from the charging station and used maliciously to disarm and/or unlock a merchandise security device 207. After charging, the programmable electronic key 205 would then have to be reprogrammed or refreshed by the programming station 203, which is typically monitored or maintained at a secure location, to reactivate the logic control circuit of the key. The logic control circuit of the programmable electronic key 205 may also be configured to include the internal counter feature previously described with respect to the programmable key 5 that counts the number of activations of the activation switch 285 and inactivates the logic control circuit after a predetermined number of activations so that the internal battery 275 maintains sufficient power to communicate with the programming station 203, the merchandise security device 207 or the charging station 208, as required, before the lifetime of the battery is exceeded.

Figure 25:
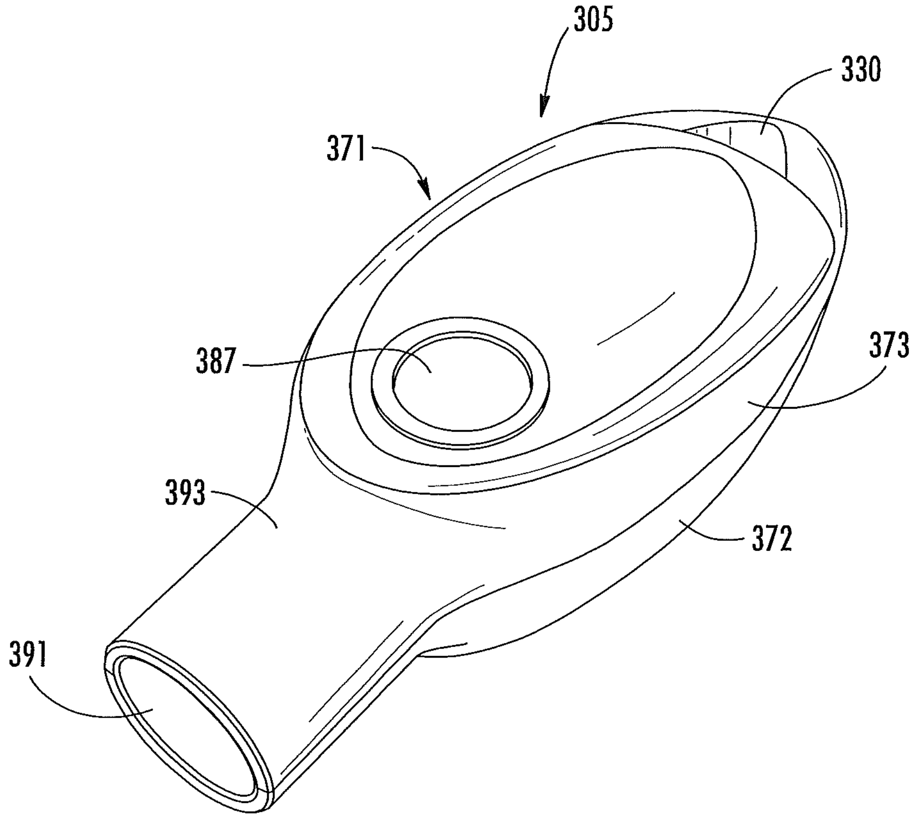
FIG. 25 is a diagrammatic view of a programmable electronic key with inductive transfer for use with a security system according to the invention.
Figure 26:
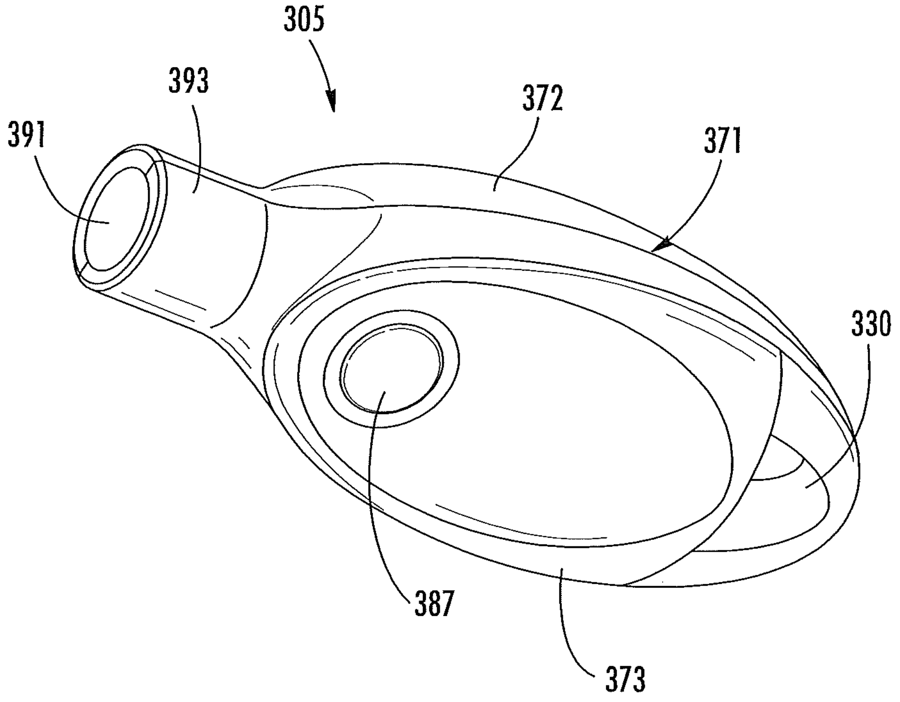
FIG. 26 is another diagrammatic view of the programmable electronic key with inductive transfer of FIG. 25.
Figure 27:
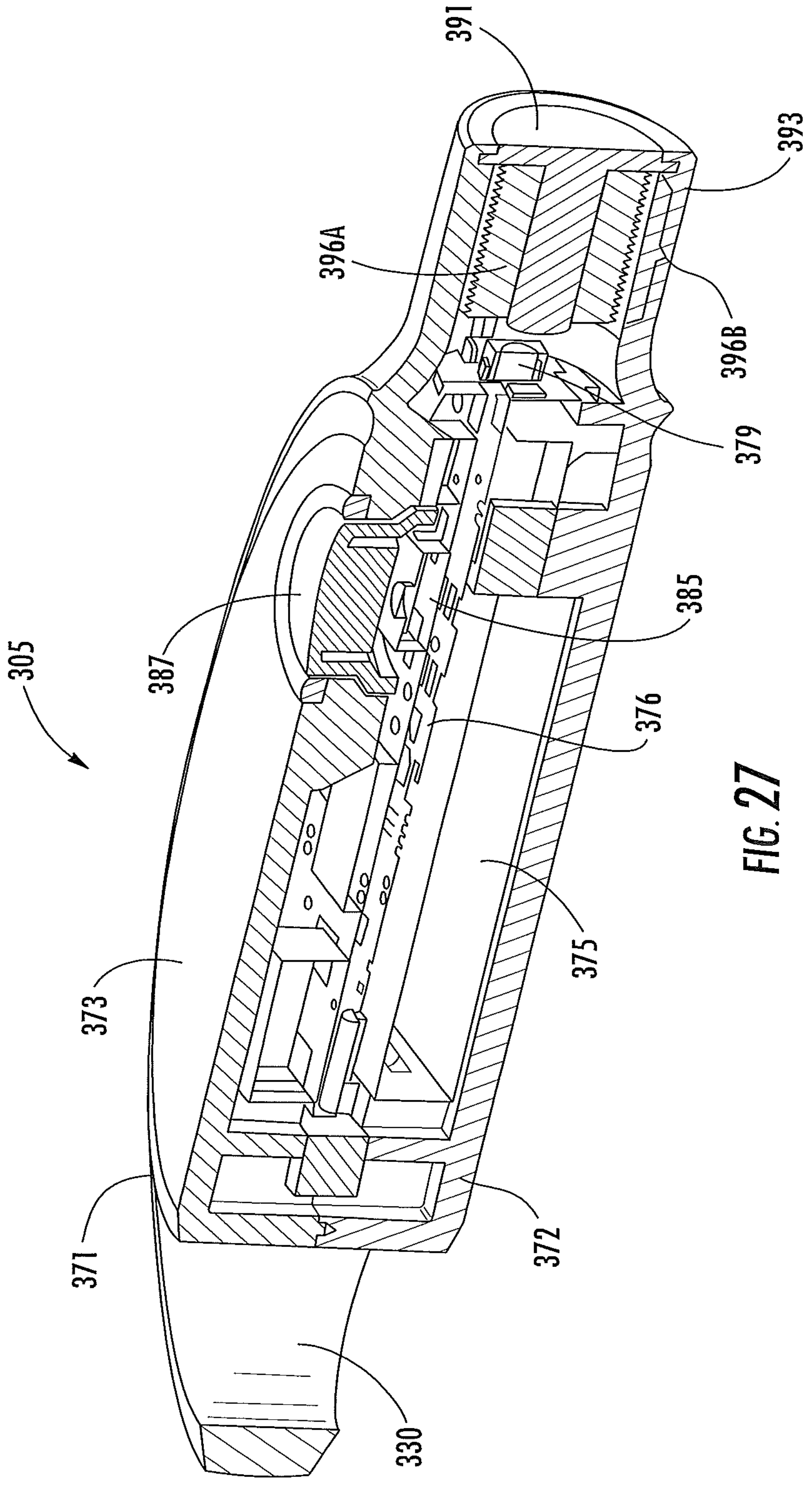
FIG. 27 is a diagrammatic sectional view of the programmable electronic key with inductive transfer of FIG. 25.

FIGS. 25-27 show another exemplary and preferred embodiment of a programmable electronic key, indicated generally at 305, for use with a security system including an alarm module or other security device, as previously described. In this embodiment, the power transfer function provided by the electrical contacts is accomplished with inductive transfer. As previously mentioned, security devices suitable for use with the programmable electronic key 305 include, but are not limited to, a security display (e.g. alarm module or display stand), a security fixture (e.g. hook, shelf, cabinet) and security packaging for an item of merchandise. However, a programmable electronic key 305 with inductive transfer according to the present invention is useable with any security device or locking device that utilizes power transferred from the key to operate an electronic lock mechanism, or alternatively, utilizes data transferred from the key (or between the key and the security device) to authorize or permit operation of a physical lock mechanism along with power transferred from the key to operate the physical lock mechanism. In other words, the programmable electronic key 305 is useable with any security device or locking device with inductive transfer capability that requires power transfer from the key to the device by induction, or alternatively, data transfer between the key and the device and power transfer from the key to the device by induction. Further examples include, but are not limited to, a door lock, a drawer lock or a shelf lock, as well as any device that prevents an unauthorized person from accessing, removing or detaching an item from a secure location or position.

In a specific example, a merchandise display security system and method according to the present invention utilizes the programmable electronic key 305 with inductive transfer and a programming station, merchandise security device and charging station similar to the components shown and described above with respect to FIG. 18-22A wherein at least the merchandise security device 207 and the optional charging station 208 are configured with inductive transfer capability for transferring power from the key to the merchandise security device and for transferring power from the charging station to the key, respectively. In other words, the merchandise security device 207 is provided with inductive transfer capability compatible with the inductive transfer of the programmable electronic key 305 to be operated by the key. Likewise, the charging station 208 is provided with inductive transfer capability compatible with the programmable electronic key 305 to initially charge and/or recharge the internal battery of the key. It should be noted that the programming station 203 may likewise be provided with inductive transfer capability compatible with the inductive transfer of the programmable electronic key 305 to initially program (and reprogram or refresh) the key with a security code (i.e. SDC) by inductive transfer instead of the wireless infrared (IR) system previously described. Data communication (e.g. SDC and "handshake") between the merchandise security device 207 and the programmable electronic key 305 may likewise be accomplished by inductive transfer instead of the wireless infrared (IR) system previously described. The programmable electronic key 305 with inductive transfer may be used without a programming station, and thus without a security code programmed, reprogrammed or refreshed at a retail store, to operate a purely mechanical security device, such as a cabinet lock. Furthermore, the programmable electronic key 305 with inductive transfer may be provided with a conventional or extended-life internal battery, and thus, may be used without a charging station. In preferred embodiments, however, the programmable electronic key 305 with inductive transfer is provided with a transient memory, such that a security code (i.e. SDC) must be initially programmed and subsequently reprogrammed or refreshed at predetermined time intervals, as previously described. In such embodiments, a programming station similar to the programming station 3, 203 is provided to initially program and/or to subsequently reprogram the SDC into the programmable electronic key 305 and the key is operable to initially program and/or to subsequently reprogram a security device similar to alarm module 7 or merchandise security device 207 with the SDC. The programmable electronic key 305 is further operable to operate the security device by transferring power by induction, or by transferring data and power by induction, to the device, as will be described. An optional charging station similar to the charging station 208 may be provided to initially charge and/or subsequently recharge a rechargeable internal battery disposed within the programmable electronic key 305 in the manner previously described.

When the merchandise security device 207 is a purely mechanical security device, or alternatively, is an authorized security device already having the SDC and a proper "handshake" is completed, a logic control circuit of the programmable electronic 305 causes the internal battery of the key to transfer electrical power to the lock mechanism of the merchandise security device. More particularly, an inductive transceiver disposed within the programmable electronic key 305 operatively couples to a corresponding inductive transceiver disposed within the merchandise security device and transfers power from the internal battery of the key to the lock mechanism of the security device, for example to lock or unlock the security device. By way of example and without limitation, the programmable electronic key 305 transfers power to an electric motor, DC stepper motor, solenoid, or the like that unlocks the lock mechanism of the cabinet lock 207 so that the cabinet lock can be removed from the lock arm 211 of the lock bracket 213 and the sliding doors 201 moved (i.e. slid) relative to one another to access the items of merchandise 209 stored within the cabinet 202. It will be readily apparent to those skilled in the art that the cabinet lock 207 illustrated and described herein is but one of numerous types of a "passive" merchandise security device that can be configured to be operated by a programmable electronic key 305 according to the present invention. By way of example and without limitation, the merchandise security device may be a locking base for securing a merchandise display hook to a display support, such as pegboard, slatwall, bar stock or wire grid, or may be a locking end assembly for preventing the rapid removal of merchandise from the merchandise display hook. Alternatively, the merchandise security device may be a merchandise security alarm module or display stand comprising a lock mechanism for securing the display stand to a display support, such as a table, counter, desk, wall, or other fixed structure, and/or a lock mechanism for securing an item of merchandise on the alarm module or display stand. Alternatively, the merchandise security device may be incorporated into packaging for one or more items of merchandise comprising a lock mechanism for separating the packaging from the merchandise and/or for removing the merchandise from the packaging. Still further, the merchandise security device may be a conventional door or window lock for preventing access to an enclosure, such as a room, booth or closet. In any of these or other embodiments, the merchandise security device may further comprise an electronic lock mechanism in the form of a sensor, such as a conventional proximity, limit or contact switch, and an associated electronic monitoring circuit that activates an alarm in response to the sensor being actuated or the integrity of the sensor or monitoring circuit being compromised. Regardless, the merchandise security device preferably includes a logic control circuit, or the equivalent, including a SDC memory for storing a SDC, and a communication circuit for initially receiving the SDC from the programmable electronic key 205, and for subsequently facilitating data communication, including the SDC, between the programmable electronic key and the merchandise security device.

As previously mentioned, the programmable electronic key 305 preferably is configured to transfer both data and power to a merchandise security device that comprises an electronic lock mechanism and a physical lock mechanism. Accordingly, the programmable electronic key 305 must be an "active" device in the sense that it has an internal power source sufficient to operate the physical lock mechanism of the merchandise security device. As a result, the programmable electronic key 305 may be configured to transfer data from an internal source, such as a logic control circuit disposed within the key, and to transfer power from an internal power source, such as a conventional, extended-life or rechargeable battery disposed within the key. The exemplary embodiment of the programmable electronic key 305 depicted in FIGS. 25-27 is a merchandise security key with inductive transfer capability configured to be received within a key receiving port of a programming station as well as a key receiving port of a merchandise security device and a key receiving port (or charging port) of a charging station in the manner previously described with respect to the embodiments of FIGS. 18-24A. As such, the programmable electronic key 305 comprises a logic control circuit for performing a "handshake" with the logic control circuit of the programming station and for receiving the SDC from the programming station, as previously described. The logic control circuit of the programmable electronic key 305 further performs a "handshake" with the logic control circuit of the merchandise security device and transfers the SDC to the merchandise security device, as previously described. Communication of the data (e.g. "handshake" and SDC) may be accomplished (i.e. transferred) by electrical contacts, optical transmission, acoustic transmission, radio frequency (RF) or magnetic induction. In a particularly advantageous embodiment, a key 305 with inductive transfer according to the present invention may be configured to transfer both electrical power to a merchandise security device and to communicate data, including for example the "handshake"

and the SDC, between the programmable electronic key and the security device by magnetic induction.

As best shown in FIG. 27, the programmable electronic key 305 comprises a housing 371 defining an internal cavity or compartment that contains the internal components of the key, including without limitation an internal battery 375 and a logic control circuit formed on a printed circuit board (PCB) 376 comprising at least a SDC memory and a communication circuit, as previously described. As shown, housing 371 is formed by a lower portion 372 and an upper portion 373 that are joined together after assembly, for example by ultrasonic welding. The programmable electronic key 305 further defines an opening 330 at one end for coupling the key to a key chain ring, lanyard or the like. The programmable electronic key 305 further comprises a transfer end 393 located at an end of housing 371 opposite the opening 330 for transferring data and power to the merchandise security device, as previously described. The transfer end 393 is also operable to transmit and receive the "handshake" and the SDC with the programming station, as previously described, and to receive power from the charging station, as will be described in greater detail with reference to FIGS. 28 and 28A.

The programmable electronic key 305 further includes an inductive coil having high magnetic permeability that is adapted (sized and shaped) to be disposed within the housing 371 adjacent the transfer end 393. As shown, the inductive coil comprises a highly magnetically permeable ferrite core 396A surrounded by a plurality of inductive core windings 396B. The inductive core windings 396B consist of a length of a conductive wire that is wrapped around the ferrite core 396A. As will be readily understood and appreciated by those skilled in the art, passing an alternating current through a conductive wire generates (induces) a magnetic field around an inductive core. An alternating current may be passed through the conductive wire of the inductive core windings 396B by connecting one lead of the conductive wire to the logic control circuit and connecting the other lead of the conductive wire to the internal battery 375 of the programmable electronic key 305. A similar inductive coil having high magnetic permeability is adapted (sized and shaped) to be disposed within the housing of the merchandise security device, such as within housing 235 of the cabinet lock 207 previously described and shown in FIG. 20 adjacent the key receiving port 265. The inductive coil of the merchandise security device comprises a highly magnetically permeable ferrite core surrounded by a plurality of inductive core windings consisting of a length of a conductive wire that is wrapped around the ferrite core similar to the inductive coil disposed adjacent the transfer end 393 of the programmable electronic key 305. Placing the transfer end 393 of the programmable electronic key 305 into the key receiving port 265 of the cabinet lock 207 and passing an alternating current through the inductive core windings 396B of the inductive core of the key generates a magnetic field in the vicinity of the key receiving port 265 of the cabinet lock 207. As a result, an alternating current is generated (induced) in the conductive wire of the inductive core windings of an inductive coil having leads connected to the logic control circuit of the cabinet lock 207. The alternating current induced in the inductive coil of the cabinet lock 207 is then transformed into a direct current (DC) voltage in a known manner, such as for example via a bridge rectifier on the logic control circuit, to provide direct current (DC) power to the cabinet lock 207. The DC power generated in the cabinet lock 207 by the inductive coil of the programmable electronic key 305 may be used, for example, to unlock a lock mechanism disposed within the housing 235 of the cabinet lock.

As previously mentioned with regard to FIG. 27, the internal battery 375 and the logic control circuit formed on printed circuit board (PCB) 376 are disposed within the housing 371 of the programmable electronic key 305. Battery 375 may be a conventional or extended-life replaceable battery, but preferably, is a rechargeable battery suitable for use with a charging station similar to the charging station 208 previously described. Printed circuit board 376 is operatively coupled and electrically connected to an activation switch 385 that is actuated by a flexible member in the form of a control button 387 provided on the exterior of the programmable electronic key 305 and extending through the housing 371. Control button 387 in conjunction with activation switch 385 controls certain operations of the logic control circuit, and in particular, initiates communication of data (i.e. "handshake" and SDC) between the programmable electronic key 305 and the programming station, and between the key and the merchandise security device. For that purpose, printed circuit board 376 is further operatively coupled and electrically connected to the communication circuit of the logic control circuit for transmitting and receiving the "handshake" and SDC data. In the exemplary embodiment shown and described herein, the communication circuit is a wireless infrared (IR) system including an optical transceiver 379 for transmission of data between the programmable electronic key 305 and the programming station, and between the key and the merchandise security device. As a result, the transfer end 393 of the key 305 is provided with an optically transparent or translucent lens 391 for emitting and collecting optical transmissions between the key 305 and the programming station, or between the key and the merchandise security device. As previously described, transfer end 393 further comprises the inductive coil comprising inductive core 396A and inductive core windings 396B for transferring electrical power to the merchandise security device and/or receiving electrical power from the charging station to charge the internal battery 375. Accordingly, the leads of the conductive wire of the inductive coil are electrically connected and operably coupled to the printed circuit board 376, which in turn is electrically connected to the battery 375, in a suitable manner, for example by conductive insulated wires or plated conductors. In an alternative embodiment, the optical transceiver 379 is eliminated and data is transferred between the programmable electronic key 305 and the merchandise security device by magnetic induction using the inductive coil in a known manner.

Figure 28:
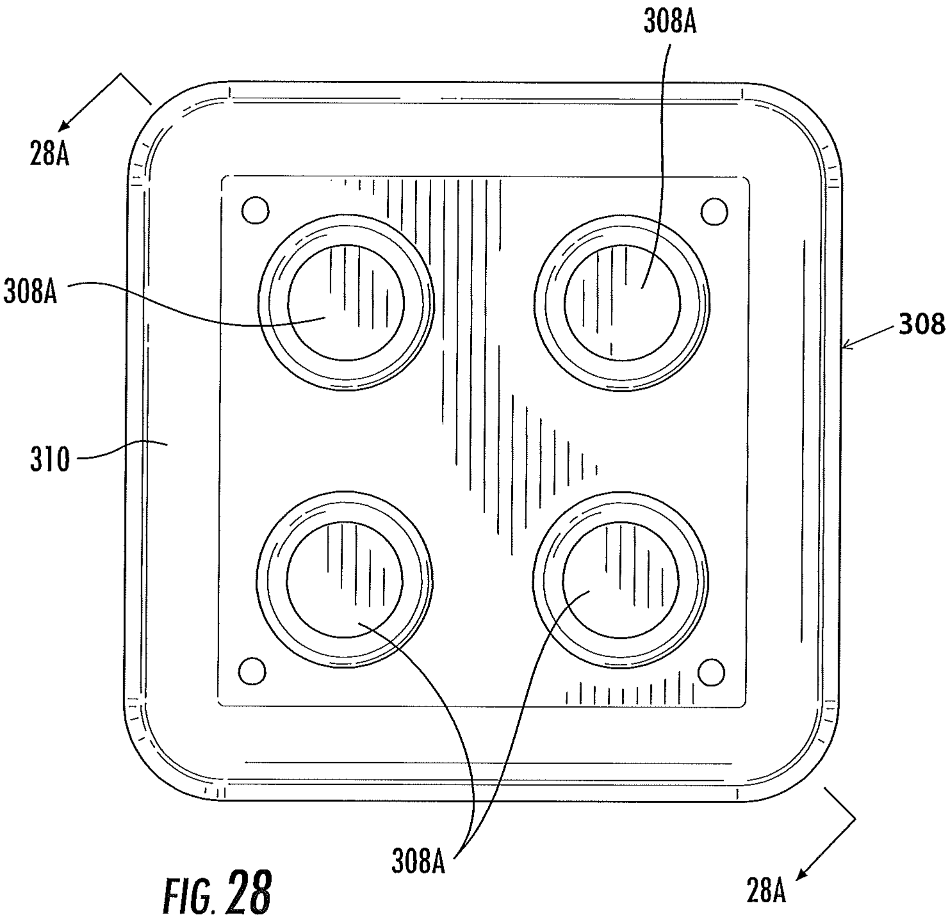
FIG. 28 and FIG. 28A are top plan and diagrammatic sectional views, respectively, of a charging station for use with the programmable electronic key with inductive transfer of FIG. 25.
Figure 28A:
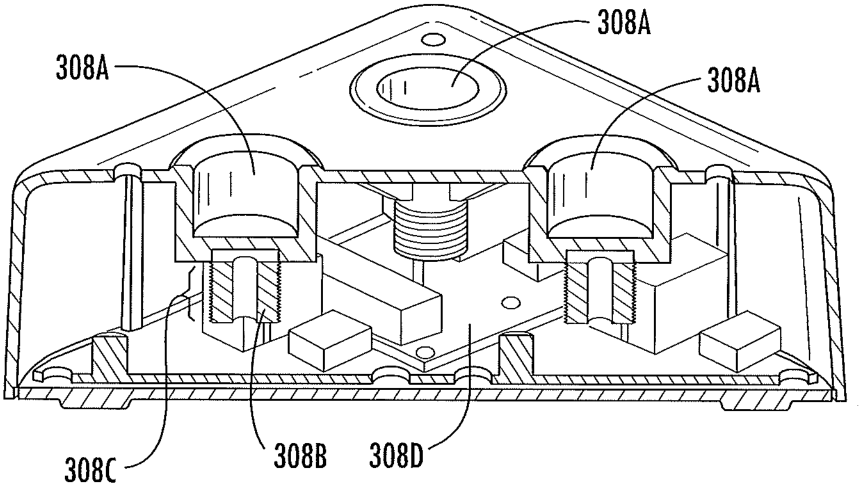

FIGS. 28 and 28A show an exemplary embodiment of a charging station 308 with inductive transfer capability according to the present invention. As previously mentioned, charging station 308 is used to initially charge and/or recharge the internal battery 375 of the merchandise security key 305. In certain instances, the charging station 308 also deactivates the data transfer and/or power transfer capability of the key 305 until the key has been reprogrammed with the SDC by a programming station. Regardless, the charging station 308 comprises a housing 310 for containing the internal components of the charging station. The exterior of the housing 310 has at least one, and preferably, a plurality of charging ports 308A formed therein that are sized and shaped to receive the transfer end 393 of a programmable electronic key 305. As previously described, one or more magnets may be provided for properly positioning and securely retaining the transfer end 393 of the programmable electronic key 305 within the charging port 308A such that the inductive coil of the key is in alignment with a corresponding inductive coil 308B, 308C (FIG. 28A) disposed within the housing 310 of the charging station 308 adjacent the charging port. As will be readily understood and appreciated by those skilled in the art, the inductive coil adjacent the charging port 308A of the charging station 308 generates (induces) an alternating current in the conductive wire of the inductive core windings 396B of the inductive coil in the programmable electronic key 305 that in turn provides direct current (DC) power, for example via a bridge rectifier on the printed circuit board 376, to charge the battery 375 of the key.

As shown in FIG. 28A, housing 310 is sized and shaped to contain a logic control circuit formed on a printed circuit board (PCB) 308D that is electrically connected and operatively coupled to the inductive coil 308B, 308C adjacent each of the charging ports 308A. As previously described, each inductive coil comprises an inductive core 308B surrounded by a plurality of inductive core windings 308C formed by a conductive wire having a pair of leads (not shown). When an alternating current is passed through the conductive wire of the inductive core windings 308C with the transfer end 393 of the programmable electronic key 305 inserted into a charging port 308A of the charging station 308, the inductive coil 308B, 308C of the charging station generates a magnetic field that induces an alternating current in the conductive wire of the inductive core windings 396B of the inductive coil of the key. The alternating current in the inductive coil of the programmable electronic key 305 is then transformed into direct current (DC) power used to charge the internal battery 375 of the programmable electronic key. As shown, charging station 308 with inductive transfer may comprise an internal power source, for example, an extended-life replaceable battery or a rechargeable battery, for providing power to the programmable electronic key(s) 305 with inductive transfer positioned within the charging port(s) of the charging station. Alternatively, the logic control circuit on the printed circuit board 308D of the charging station 308 is electrically connected to an external power source by a power cord having at least one conductor. Furthermore, logic control circuit on printed circuit board 308D may be operable for deactivating the data transfer and/or power transfer functions of the programmable electronic key 305, or alternatively, for activating the "time-out" feature of the key until it is reprogrammed or refreshed by the programming station.

An available feature of a merchandise security system and method according to the present invention is that the logic control circuit of the programmable electronic key 305 may include a time-out function. More particularly, the ability of the key 305 to transfer data and power to the merchandise security device is deactivated or invalidated after a predetermined time period. By way of example, the logic control circuit may be deactivated after about 6 to about 12 hours from the time the key was programmed or last refreshed by the programming station. In this manner, an authorized person typically must program, reprogram or refresh the key 305 assigned to him at the start of each work shift. Furthermore, the charging station 308 may be configured to deactivate or invalidate the logic control circuit of the key 305 when the key is positioned within a charging port 308A. In this manner, the charging station 308 can be made available to an authorized person in an unsecured location, while the programming station remains in a secured location without concern that a programmable electronic key 305 could be removed from the charging station 308 and maliciously used to disarm and/or unlock a merchandise security device. After charging, the programmable electronic key 305 would then be reprogrammed or refreshed by the programming station, which as previously mentioned is monitored or maintained at a secure location, in order to reactivate the logic control circuit of the key. The logic control circuit of the programmable electronic key 305 may also be configured to include the internal counter feature previously described with respect to the programmable key 5 that counts the number of activations of the activation switch 385 and inactivates the logic control circuit after a predetermined number of activations so that the internal battery 375 maintains sufficient power to communicate with the programming station, the merchandise security device or the charging station 308, as required, before the lifetime of the battery is exceeded.

In the foregoing description, certain terms have been used for brevity, clarity and/or simplification. No unnecessary limitations are to be implied therefrom beyond the requirement of the prior art because such terms are used for descriptive purposes and are intended to be construed broadly with respect to the concept and intended scope of the present invention. Moreover, the description and illustration of exemplary and preferred embodiments of the present invention is not intended to be limited to the exact details shown or described herein.

That which is claimed is:

1. A programmable security system for protecting merchandise comprising:

a programmable key having a wireless communication circuit, a memory for storing a security code, and a power source, wherein the programmable key comprises a housing enclosing the wireless communication circuit, the memory, and the power source; and a security device having a memory for storing the security code, the security device further comprising a lock mechanism and a motor;

wherein the programmable key is configured to wirelessly communicate with the security device via the wireless communication circuit and to wirelessly transfer power from the power source to the security device by inducing an electrical current in the security device, wherein the lock mechanism is configured to be operated by the motor using power transferred from the programmable key to the security device when the security code stored in the memory of the security device matches the security code stored in the memory of the programmable key, wherein the programmable key comprises a magnetic core and a conductive wire forming a plurality of windings and electrically connected to the power source of the programmable key such that passing an electrical current through the conductive wire of the programmable key induces a magnetic field in the programmable key;

wherein the security device comprises a magnetic core and a conductive wire forming a plurality of windings such that the magnetic field in the programmable key induces an electrical current in the conductive wire of the security device; and wherein the programmable key is adapted to transfer power from the programmable key to the security device via the magnetic field induced in the programmable key and the electrical current induced in the security device.

2. The programmable security system of claim 1, wherein the programmable key comprises means for inducing a magnetic field and the security device comprises means for inducing an electrical current from the magnetic field; and wherein the programmable key is adapted to transfer power from the programmable key to the security device via the magnetic field induced in the programmable key and the electrical current induced in the security device.

3. The programmable security system of claim 1, further comprising a programming station configured to generate the security code and having a memory for storing the security code.

4. The programmable security system of claim 3, wherein the programming station is configured to initially communicate the security code to the programmable key to be stored in the memory of the programmable key.

5. The programmable security system of claim 1, wherein the security device is configured to communicate with the programmable key to receive the security code from the programmable key.

6. The programmable security system of claim 1, wherein the programmable key is configured to transfer power inductively to the security device.

7. The programmable security system of claim 1, wherein the programmable key is configured to communicate data and power with the security device via magnetic induction.

8. The programmable security system of claim 1, wherein the security device does not have an internal power source.

9. The programmable security system of claim 1, wherein the power source is a rechargeable battery.

10. The programmable security system of claim 1, further comprising a charging station configured to charge the power source of the programmable key.

11. The programmable security system of claim 10, wherein the charging station is configured to charge the power source of the programmable key inductively.

12. The programmable security system of claim 1, wherein the housing comprises a transfer end configured to transfer power to the security device.

13. The programmable security system of claim 1, wherein the programmable key is configured to communicate data with the security device using optical communication.

14. A method for protecting merchandise, comprising:

storing a security code in a memory of a programmable key, the programmable key having a wireless communication circuit and a power source, wherein the programmable key comprises a housing enclosing the wireless communication circuit, the memory, and the power source, wherein the programmable key further comprises a magnetic core and a conductive wire forming a plurality of windings and electrically connected to the power source of the programmable key such that passing an electrical current through the conductive wire of the programmable key induces a magnetic field in the programmable key;

storing the security code in a memory of a security device, the security device comprising a lock mechanism and a motor, wherein the security device further comprises a magnetic core and a conductive wire forming a plurality of windings such that the magnetic field in the programmable key induces an electrical current in the conductive wire of the security device;

wirelessly communicating between the programmable key and the security device;

determining whether the security code stored in the memory of the security device matches the security code stored in the memory of the programmable key;

wirelessly transferring power from a power source of the programmable key to the security device via the magnetic field induced in the programmable key and the electrical current induced in the security device; and operating a lock mechanism by the motor using power transferred from the programmable key to the security device when the security code stored in the memory of the security device matches the security code stored in the memory of the programmable key.

15. The method of claim 14, further comprising:

inducing a magnetic field in the programmable key; and inducing an electrical current in the security device from the magnetic field, wherein the wirelessly transferring comprises wirelessly transferring power from the programmable key to the security device via the magnetic field induced in the programmable key and the electrical current induced in the security device.

16. The method of claim 14, further comprising generating the security code in a programming station and storing the security code in a memory of the programming station.

17. The method of claim 16, further comprising communicating the security code from the memory of the programming station to the memory of a programmable key.

18. The method of claim 14, further comprising wirelessly communicating the security code from the memory of the programmable key to the memory of a security device.

19. The method of claim 14, wherein the transferring comprises transferring power inductively from the programmable key to the security device.

* * * * *